United States Patent [19]

Arai et al.

[11] Patent Number: 5,079,822
[45] Date of Patent: Jan. 14, 1992

[54] METHOD OF ASSEMBLING AUTOMOTIVE BODY AND BODY PANELS, APPARATUS FOR REMOVING AND INSTALLING BODY PANELS, AND FEED JIG FOR FEEDING BODY PANELS

[75] Inventors: Hiroshi Arai; Toru Yamamoto; Shogo Ozawa; Tadashi Takeo; Kengo Shibusawa, all of Sayama, Japan

[73] Assignee: Honda Giken Kogyo Kabushiki Kaisha, Tokyo, Japan

[21] Appl. No.: 499,067

[22] Filed: Mar. 26, 1990

[30] Foreign Application Priority Data

| Mar. 27, 1989 | [JP] | Japan | 1-71677 |
| Mar. 27, 1989 | [JP] | Japan | 1-71678 |
| Mar. 27, 1989 | [JP] | Japan | 1-71679 |
| Mar. 27, 1989 | [JP] | Japan | 1-71681 |
| Mar. 27, 1989 | [JP] | Japan | 1-71682 |

[51] Int. Cl.$^5$ .................. B23P 19/00; G05B 19/42
[52] U.S. Cl. .................... 29/430; 29/431; 29/527.2; 29/771; 29/783; 29/787; 29/791
[58] Field of Search .......... 29/429, 430, 431, 527.2, 29/700, 771, 783, 787, 791

[56] References Cited

U.S. PATENT DOCUMENTS

| 4,589,199 | 5/1986 | Ohtaki et al. | 29/430 X |
| 4,667,866 | 5/1987 | Tobita et al. | 29/430 X |
| 4,669,168 | 6/1987 | Tamura et al. | 29/429 |
| 4,736,515 | 4/1988 | Catena | 29/430 X |
| 4,930,213 | 6/1990 | Hayakawa et al. | 29/430 X |

Primary Examiner—Timothy V. Eley

[57] ABSTRACT

An automotive body and body panels such as an engine hood, a trunk lid, and doors are assembled together along an assembling line. The automotive body with the body panels removably installed thereon and a feed jig on which the body panels can removably be installed thereon, are alternately fed along a first feed path. Then, the body panels are removed from the automotive body while they are being fed along the first feed path and the body panels are installed on the feed jig which is fed upstream of the automotive body along the first feed path. The automotive body from which the body panels have been removed and the body panels which have been installed on the feed jig are thereafter coated. Thereafter, the coated automotive body and the coated body panels are fed along a second feed path. The body panels are removed from the feed jig while they are being fed along the second feed path and the removed body panels are installed on the automotive body which is also fed along the second feed path. The feed jig is arranged to install the body panels thereon with fasteners which are used to install the body panels on the automotive body.

29 Claims, 22 Drawing Sheets

FIG. 8

METHOD OF ASSEMBLING AUTOMOTIVE BODY AND BODY PANELS, APPARATUS FOR REMOVING AND INSTALLING BODY PANELS, AND FEED JIG FOR FEEDING BODY PANELS

BACKGROUND OF THE INVENTION

The present invention relates to a method of assembling body panels such as doors, an engine hood, a trunk lid, etc. and an automotive body together in an automobile production line such as an automobile coating line, the method essentially comprising temporarily removing the body panels from the automotive body, thereafter coating or otherwise treating the automotive body and the body panels, and then installing the body panels to the automotive body. The present invention is also directed to an apparatus for removing body panels from and installing body panels on an automotive body in the assembling method, and also a feed jig for holding and feeding body panels when they are removed from or installed on an automotive body, or treating body panels in the assembling method.

Automobile production lines include a section where an automotive body and various body panels such as doors, an engine hood, a trunk lid, etc. are coated or otherwise treated. To treat the automotive body and body panels in such a section, the body panels are temporarily removed from the automotive body. Then, the separated automotive body and body panels are coated or otherwise treated, and thereafter the body panels are installed back on the automotive body, i.e., they are assembled together.

In an automobile coating line, for example, it would be difficult to apply a uniform coating to body panels and an automotive body if the body panels remained attached to the automotive body. There has been known an assembling method which avoids the above drawback. According to the known assembling method, an automotive body and a body panel which is attached to the automotive body are pretreated, e.g., coated with an electrodeposited coating layer, and then the body panel is removed from the automotive body. The body panel and the automotive body are then fed along respective feed paths, during which an undercoat such as a surfacer and a sealing layer are applied to them. Thereafter, the body panel is installed again on the automotive body. In this manner, the automotive body and the body panel are coated and assembled together.

The body panel is removed from and installed on the automotive body in the following manner: Usually, there are employed a automotive body feed path for feeding the automotive body therealong, and a body panel feed path for feeding a feed jig on which the body panel can removably be mounted, the feed paths extending parallel to each other. Between these feed paths, there are disposed an apparatus for removing the body panel from the automotive body, and an apparatus for installing the body panel on the automotive body. For removal and installation of the body panel, the body panel is transferred between the automotive body fed along the automotive body feed path and the feed jig fed along the body panel feed path by the removing and installing apparatus. For example, Japanese Laid-Open Patent Publication No. 61(1986)-146690 discloses an apparatus for installing a door on an automotive body. The door installing apparatus is disposed between a door feed path for feeding a feed jig with the door removably mounted thereon and an automotive body feed path for feeding the automotive body. The door is detached from the feed jig and installed on the automotive body by the door installing apparatus.

Since the body panel feed path and the automotive body feed path are separately required for removal of the body panel from and installation of the body panel on the automotive body, the arrangement of the automobile coating line is large in size, and the range in which the body panel removing and installing apparatus operates is large. It is therefore time-consuming to install and remove the body panel, and the efficiency of the installing and removing process is poor. As the body panel removing and installing apparatus operates in a large range, the apparatus itself is large in size and complex in construction.

The body panel, which is installed on the automotive body by fasteners such as hinge pins or bolts, is normally held on the feed jig by a clamp or the like disposed on the feed jig. Consequently, when the body panel is detached from the automotive body and mounted on the feed jig, such fasteners are removed and not used, but when the body panel is to be installed back on the automotive body, the fasteners are required. It is therefore necessary to add a fastener feed path for feeding the removed fasteners from the area where the body panel is detached from the automotive body to the area where the body panel is attached again to the automotive body. As a result, the fasteners must be transferred between the body panel removing and installing apparatus and the fastener feed path. The additional fastener feed path and the transfer of the fasteners are obstacles to efforts to reduce the size of the automobile coating line, and also to increase the efficiency of removing and installing the body panel.

When each of body panels removed from an automotive body is to be coated in an automobile coating line, the body panel is horizontally or vertically mounted on a feed jig so that the surface of the body panel to be coated is directed laterally or upwardly, and is fed together with the feed jig while at the same time the surface of the body panel is coated by a coating robot, a reciprocator, or the like, as disclosed in Japanese Laid-Open Patent Publications Nos. 63(1988)-107782 and 59(1984)-98773.

According to the disclosed coating methods, the body panel is kept on the feed jig in a constant posture. For coating both inner and outer surfaces of the body panel, therefore, it is necessary to apply a coating to the inner surface, for example, of the body panel while the body panel is being supported on the feed path with the inner surface being directed upwardly or laterally, and then to mount the body panel again on the feed jig so that the outer surface of the body panel is upwardly or laterally. With the disclosed coating methods, therefore, it was difficult to successively coat the inner and outer surfaces efficiently while the body panel is being held on the feed jig.

After the body panel is coated, it is delivered, together with the feed jig, into a drying furnace in which the coated layer is baked. One problem is that since the coated surface is oriented upwardly or laterally, dust particles or other foreign matter may be applied to the coated surface, impairing the coated layer.

The feed jig disclosed in Japanese Laid-Open Patent Publications Nos. 63(1988)-107782 and 59(1984)-98773 is not so shaped as to take into account the transfer of a body panel between the feed jig and an automotive body. As a result, the operation of the body panel removing and installing apparatus is complex, lowering the efficiency in removing and installing the body panel.

SUMMARY OF THE INVENTION

In view of the aforesaid shortcomings of the conventional methods of installing an automotive body and openable body panels, it is an object of the present invention to provide a method of assembling body panels such as doors, an engine hood, a trunk lid, etc., and an automotive body together in an automobile production line such as an automobile coating line, the method essentially comprising temporarily removing the body panels from the automotive body, thereafter coating or otherwise treating the automotive body and the body panels, and then installing the body panels to the automotive body, the above series of operations being successively effected efficiently with a small-size coating line arrangement.

Another object of the present invention is to provide a method of efficiently removing and installing body panels from and on an automobile body with a small-size and simple coating line arrangement.

Still another object of the present invention is to provide a method of successively and efficiently coating inner and outer surfaces of body panels removed from an automotive body and of baking the coated surfaces without impairing the coated layers, with a relatively simple automobile coating line arrangement.

Yet another object of the present invention is to provide a method of efficiently and uniformly applying a coating layer to an automotive body and body panels removed therefrom, with a small-size automobile coating line arrangement.

A further object of the present invention is to provide an apparatus which is small in size and relatively simply operable to remove and install body panels from and on an automotive body in an automobile production line such as an automobile coating line.

A still further object of the present invention is to provide a feed jig which can easily transfer body panels between the feed jig and an automotive body at the time of removing and installing the body panels from and on the automotive body, and which allows the body panels to be coated efficiently while holding and feeding the body panels.

According to a first aspect of the present invention, there is provided a method of assembling an automotive body and body panels, comprising the steps of: (a) alternately feeding an automotive body with body panels removably installed thereon and a feed jig on which the body panels can removably be installed thereon, along a first feed path; (b) removing the body panels from the automotive body while they are being fed along the first feed path and installing the body panels on the feed jig which is fed upstream of the automotive body along the first feed path; (c) treating the automotive body from which the body panels have been removed and the body panels which have been installed on the feed jig; (d) alternately feeding the automotive body which has been treated and the feed jig on which the treated body panels have been installed, along a second feed path with the automotive body being positioned upstream of the feed jig; and (e) removing the body panels from the feed jig while they are being fed along the second feed path and installing the removed body panels on the automotive body which is fed upstream of the feed jig along the second feed path.

The feed jig is arranged to install said body panels thereon with fasteners which are used to install said body panels on said automotive body, said step (b) comprising the steps of removing the body panels together with the fasteners from the automotive body, and then installing said body panels on said feed jig with said fasteners, said step (e) comprising the steps of removing said body panels together with said fasteners from said feed jig, and installing said body panels on said automotive body with said fasteners.

The step (c) comprises the steps of feeding said automotive body and said feed jig respectively along an automotive body feed path and a body panel feed path which extending from said first feed path, treating said automotive body and said body panels while they are being fed along said automotive body feed path and said body panel feed path, respectively, and thereafter successively introducing said feed jig and said automotive body into said second feed path to which said body panel feed path and said automotive body feed path are joined.

The step (c) comprises the steps of treating said automotive body and said body panels while they are being fed along said first feed path, thereafter feeding said automotive body and said feed jig respectively along an automotive body feed path and a body panel feed path which extending from said first feed path, and thereafter successively introducing said feed jig and said automotive body into said second feed path to which said body panel feed path and said automotive body feed path are joined.

The step (a) comprises the steps of feeding said automotive body along said first feed path, introducing said feed jig into said first feed path upstream of said automotive body, and alternately feeding said automotive body and said feed jig along said first feed path, and wherein said step (d) comprises the steps of feeding said feed jig, from which the body panels have been removed in said step (e), from said second feed path into a jig feed path branched from said second feed path, and then feeding said feed jig along said jig feed path back into said first feed path to which said jig feed path is joined.

According to a second aspect of the present invention, there is provided a method of assembling an automotive body and body panels, comprising the steps of: (a) removing body panels from an automotive body on which said body panels have been removably installed; (b) thereafter, treating said automotive body and said body panels; (c) installing the treated body panels again on the treated automotive body; and said step (a) comprising the steps of: alternately feeding the automotive body with the body panels installed thereon and a feed jig on which the body panels can removably be installed thereon, along a feed path, with the feed jig being positioned upstream of the automotive body, removing the body panels from the automotive body and holding the removed body panels in a body panel removal station on said feed path, and installing the body panels, which have been held in said body panel removal station, on said feed jig which is introduced into said body panel removal station, following the automotive body.

The feed jig is arranged to install said body panels thereon with fasteners which are used to install said body panels on said automotive body, said step (a) comprising the steps of alternately feeding the automotive body on which the body panels have been installed with the fasteners and the feed jig along said feed path, with said feed jig being positioned upstream of said automotive body, then positioning the automotive body in said body panel removal station, detaching the fasteners from the automotive body which has been positioned in said body panel removal station and holding the detached fasteners in said body panel removal station, thereafter removing the said body panels from the automotive body and holding the removed body panels in said body panel removal station, thereafter feeding the automotive body from said body panel removal station and positioning the feed jig, which is then introduced into said body panel removal station following the automotive body, in said body panel removal station, positioning said body panels, which have been held in said body panel removal station, on said feed jig which has been positioned in said body panel removal station, and thereafter installing the body panels on said feed jig with said fasteners which have been held in said body panel removal station.

According to a third aspect of the present invention, there is provided a method of assembling an automotive body and body panels, comprising the steps of: (a) removing body panels from an automotive body on which said body panels have been removably installed; (b) thereafter, treating said automotive body and said body panels; (c) installing said body panels removably on a feed jig; (d) thereafter, installing said body panels again on the treated automotive body; and said step (d) comprising the steps of: alternately feeding the feed jig on which the body panels have been installed and the automotive body from which the body panels have been removed, along a feed path, with the automotive body being positioned upstream of the feed jig, removing the body panels from the feed jig and holding the removed body panels in a body panel removal station on said feed path, and installing the body panels, which have been held in said body panel removal station, on said automotive body which is introduced into said body panel removal station, following the feed jig.

The feed jig is arranged to install said body panels thereon with fasteners which are used to install said body panels on said automotive body, further including the step of installing the body panels, which have been removed from said automotive body, on said feed jig with said fasteners, said step (d) comprising the steps of alternately feeding the feed jig on which the body panels have been installed with the fasteners and the automotive body from which the body panels have been removed along said feed path, with said automotive body being positioned upstream of said feed jig, then positioning the feed jig in said body panel removal station, detaching the fasteners from the feed jig which has been positioned in said body panel removal station and holding the detached fasteners in said body panel removal station, thereafter removing the said body panels from the feed jig and holding the removed body panels in said body panel removal station, thereafter feeding the feed jig from said body panel removal station and positioning the automotive body, which is then introduced into said body panel removal station following the feed jig, in said body panel removal station, positioning said body panels, which have been held in said body panel removal station, on said automotive body which has been positioned in said body panel removal station, and thereafter installing the body panels on said automotive body with said fasteners which have been held in said body panel removal station.

According to a fourth aspect of the present invention, there is provided a method of assembling an automotive body and body panels, comprising the steps of: (a) removing body panels from an automotive body on which said body panels have been removably installed; (b) installing the removed body panels on sides of a feed jig at spaced intervals along and substantially parallel to a feeding direction in which the feed jig will be fed, said body panels being angularly movable on said feed jig about axes along said feeding direction; (c) thereafter, coating said automotive body and said body panels, while said body panels are being fed with said feed jig; (d) installing the coated body panels again on the coated automotive body; and said step (c) comprising the steps of: feeding the body panels installed on said feed jig on a body panel feed path along said axes, together with said feed jig along a body panel feed path, turning said body panels about said axes until the body panels are oriented substantially vertically with inner panel surfaces thereof facing outwardly with respect to said feed jig, thereafter coating said inner panel surfaces of the body panels laterally with a coating robot which is positioned alongside of said body pane feed path, thereafter turning said body panels about said axes until the body panels lie substantially horizontally with outer panel surfaces thereof facing upwardly, and thereafter coating the outer panel surfaces of the body panels, from above, with a reciprocator which is positioned above the body panel feed path.

The step (c) further comprises the steps of turning said body panels about said axes until the body panels lie substantially horizontally with the outer panel surfaces facing downwardly, after said outer panel surfaces have been coated, and thereafter baking and drying the coated body panels.

According to a fifth aspect of the present invention, there is provided a method of assembling an automotive body and body panels, comprising the steps of: (a) removing body panels from an automotive body on which said body panels have been removably installed; (b) installing the removed body panels on sides of a feed jig at spaced intervals along and substantially parallel to a feeding direction in which the feed jig will be fed, said body panels being angularly movable on said feed jig about axes along said feeding direction., (c) thereafter, coating said automotive body and said body panels, while said body panels are being fed with said feed jig; (d) installing the coated body panels again on the coated automotive body; and said step (c) comprising the steps of: feeding the body panels installed on said feed jig on a body panel feed path along said axes, together with said feed jig along a body panel feed path, turning said body panels about said axes until the body panels lie substantially horizontally with inner panel surfaces thereof facing upwardly, thereafter coating said inner panel surfaces of the body panels, from above, with a first reciprocator which is positioned above said body panel feed path, thereafter turning said body panels about said axes until the body panels lie substantially horizontally with outer panel surfaces thereof facing upwardly, and thereafter coating the outer panel surfaces of the body panels, from above, with a second reciprocator which is positioned above the body panel feed path.

The step (c) further comprises the steps of turning said body panels about said axes until the body panels lie substantially horizontally with the outer panel surfaces facing downwardly, after said outer panel surfaces have been coated, and thereafter baking and drying the coated body panels.

According to a sixth aspect of the present invention, there is provided a method of assembling an automotive body and body panels including an engine hood, a trunk lid, and doors, comprising the steps of: (a) removing body panels from an automotive body on which said body panels have been removably installed; (b) installing the removed body panels on sides of a feed jig while substantially maintaining the same posture and relative positional relationship of the body panels as they are installed on the automotive body, with the engine hood and the trunk lid being positioned at substantially the same height as the uppermost ends of the doors installed on the feed jig; (c) thereafter, coating said automotive body and said body panels, while said body panels are being fed with said feed jig; (d) installing the coated body panels again on the coated automotive body; and said step (c) comprising the steps of: feeding the feed jig on which the body panels are installed and the automotive along a common feed path, laterally coating side surfaces of the automotive body and faces of the doors installed on the feed jig while the automotive body and the body panels are being fed along said feed path, and coating an upper surface of the automotive body and faces of the engine hood and the trunk lid installed on the feed jig, from above, while the automotive body and the body panels are being fed along said feed path.

According to the present invention, there is also provided an apparatus for removing and installing body panels from and on an automotive body on an assembling line for assembling the automotive body and the body panels together, the body panels including an engine hood, a trunk lid, and doors, said assembling line including a removal zone wherein the body panels are removed from the automotive body on which the body panels have been removably installed, and removably installed on a feed jig, a treating zone wherein the automotive body and the removed body panels are treated, and an installation zone wherein the treated body panels are removed from the feed jig and installed again on the automotive body, said apparatus being operable to remove the body panels from one of the automotive body and the feed jig and install the removed body panels on the other in said removal zone or said installation zone, said apparatus comprising: a pair of door mounting means disposed on opposite lateral sides of said feed jig, for removably mounting the doors in substantially the same posture as they are installed on the automotive body; engine hood mounting means and trunk lid mounting means disposed on front and rear portions of said feed jig, for removably mounting the engine hood and the trunk lid, respectively, in substantially the same posture as they are installed on the automotive body; a feed path for intermittently feeding the feed jig and the automotive body therealong, with one of the feed jig and the automotive body, on which the body panels are installed, being positioned downstream of the other; a door removing and installing station, an engine hood removing and installing station, and a trunk lid removing and installing station, which are disposed on said feed path, for positioning the feed jig and the automotive body successively therein; door removing and installing devices, disposed on opposite sides of said feed path in said door removing and installing station and movable toward positions where the doors will be installed in a vertical posture on the feed jig and the automotive body, for removing the doors from one of the feed jig and the automotive body which is positioned in said door removing and installing station, while maintaining the posture of the doors, and installing the removed doors on the other of the feed jig and the automotive body while maintaining the posture of the doors; an engine hood removing and installing device, disposed above said feed path in said engine hood removing and installing station and vertically movable toward a position where the engine hood will be installed in a horizontal posture on the feed jig and the automotive body, for removing the engine hood from one of the feed jig and the automotive body which is positioned in the engine hood removing and installing station, while maintaining the posture of the engine hood, and installing the removed engine hood on the other of the feed jig and the automotive body while maintaining the posture of the engine hood; and a trunk lid removing and installing device, disposed above said feed path in said trunk lid removing and installing station and vertically movable toward a position where the trunk lid will be installed in a horizontal posture on the feed jig and the automotive body, for removing the trunk lid from one of the feed jig and the automotive body which is positioned in the trunk lid removing and installing station, while maintaining the posture of the trunk lid, and installing the removed trunk lid on the other of the feed jig and the automotive body while maintaining the posture of the trunk lid.

Each of said door mounting means said engine hood mounting means, and said trunk lid mounting means on said feed jig comprises means for mounting one of the body panels in substantially the same posture as it is installed on the automotive body, and wherein said door removing and installing station, said engine hood removing and installing station, and said trunk lid removing and installing station are combined into a single removing and installing station.

The door mounting means are angularly movable about a pair of longitudinal axes on opposite sides of said feed jig, said engine hood mounting means and said trunk lid mounting means being angularly movable with said door mounting means about at least one of said axes, said door, engine hood, and trunk lid mounting means including means for mounting the respective body panels only substantially parallel to each other, further including means, disposed between said door removing and installing station and a combination of said engine hood removing and installing station and said trunk lid removing and installing station, for angularly moving said door, engine hood, and trunk lid mounting means about said axes.

The door mounting means comprises means for opening and closing the doors which are mounted on the door mounting means, and said door removing and installing device comprises means for removing and installing the doors from and on said feed jig or said automotive body while maintaining the doors in an opened, substantially vertical posture.

The apparatus further includes door openers, disposed on opposite sides of said feed path upstream of said door removing and installing station, for opening the closed doors which are installed on said feed jig or said automotive body.

According to the present invention, there is further provided a feed jig for feeding body panels including at least an engine hood, a trunk lid, and doors, on an assembling line for assembling the body panels and an automotive body together, said assembling line including a removal zone wherein the body panels are removed from the automotive body on which the body panels have been removably installed, a coating zone wherein the automotive body and the removed body panels are coated, and an installation zone wherein the coated body panels are installed again on the coated automotive body, said feed jig being operable to install the body panels which have been removed from the automotive body in said removal zone, and being fed in said coating zone while installing the body panels thereon, said feed jig comprising: at least engine hood mounting means, trunk lid mounting means, and a pair of door mounting means, for removably mounting thereon the engine hood, the trunk lid, and the doors, respectively, at spaced intervals and substantially parallel to a feeding direction in which the feed jig is fed in said coating zone; a pair of shafts angularly movable about their own axes and disposed respectively on opposite lateral sides of and parallel to the feeding direction; and said door mounting means being disposed on the opposite lateral sides and coupled for rotation with said shafts, respectively, said engine hood mounting means being coupled for rotation with one of said shafts forwardly of the door mounting means coupled to said one shaft with respect to said feeding direction, and said trunk lid mounting means being coupled for rotation with one of said shafts rearwardly of the door mounting means coupled to said last-mentioned one shaft with respect to said feeding direction.

The mounting means on which the body panels are mounted substantially horizontally are swingable with said shafts into positions where the body panels mounted on said mounting means are vertically superposed but spaced from each other.

The feed jig further includes swingable shafts on which said shafts are supported by arms which are disposed in a lower portion of the feed jig and extend along said feeding direction, said shafts being angularly movable about said swingable shafts into said positions where the body panels mounted on said mounting means are vertically superposed but spaced from each other.

The feed jig further includes a pair of motion imparting members coupled respectively to said shafts, whereby said mounting means can be angularly moved when drive forces are applied from an external source to said motion imparting members to angularly move said shafts about their own axes.

According to another aspect of the present invention, there is also provided a feed jig for feeding body panels including at least an engine hood, a trunk lid, and doors, on an assembling line for assembling the body panels and an automotive body together, said assembling line including a removal zone wherein the body panels are removed from the automotive body on which the body panels have been removably installed, a coating zone wherein the automotive body and the removed body panels are coated, and an installation zone wherein the coated body panels are installed again on the coated automotive body, said feed jig being operable to install the body panels which have been removed from the automotive body in said removal zone, and being fed in said coating zone while installing the body panels thereon, said feed jig comprising: at least engine hood mounting means, trunk lid mounting means, and a pair of door mounting means, for removably mounting thereon the engine hood, the trunk lid, and the doors, respectively, at spaced intervals and substantially parallel to a feeding direction in which the feed jig is fed in said coating zone; and said door mounting means being disposed on the opposite lateral sides and said engine hood mounting means and said trunk lid mounting means being disposed in front and rear positions, respectively, with said door mounting means interposed therebetween, said engine hood, trunk lid, and door mounting means being angularly movable about shafts extending along said feeding direction.

The mounting means comprise means for mounting the body panels in substantially the same posture as the body panels are installed on the automotive body.

The mounting means are operatively coupled for rotation with each other.

The feed jig further includes a motion imparting member coupled to one of said mounting means, whereby said mounting means can be angularly moved when drive forces are applied from an external source to said motion imparting member to angularly move said mounting means.

One of said door mounting means and said engine hood mounting means are coupled for rotation with each other, and the other of said door mounting means and said trunk lid mounting means are coupled for rotation with each other.

The feed jig further includes a pair of motion imparting members, one of said motion imparting member being coupled to one of said one door mounting means and said engine hood mounting means, the other motion imparting member being coupled to one of said other door mounting means and said trunk lid mounting means, whereby said mounting means can be angularly moved when drive forces are applied from an external source to said motion imparting member to angularly move said mounting means.

According to the method of the first aspect of the present invention, the body panels installed on the automotive body are removed, thereafter the automotive body and the body panels are treated, and when the body panels are to be installed again on the automotive body, the automotive body and the body panels are fed along the first and second feed paths while the body panels are transferred between the automotive body and the body panels. The body panels can be removed and installed on one feed path.

By mounting the body panels with the fasteners which are used to install them on the automotive body, it is possible to transfer the fasteners, together with the body panels, from the removal zone to the installation zone.

After the body panels have been removed, the automotive body from which the body panels have been removed and the feed jig on which the body panels have been installed are fed respectively along the automotive body feed path and the body panel feed path which are joined to the first feed panel, while at the same time the automotive body and the body panels are treated. Then, the feed panels and the automotive body are introduced into the second feed path to which the automotive body feed path and the body panel feed path are joined. Alternatively, the automotive body from which the body panels have been removed and the feed jig on which the body panels have been installed are continuously fed along the first feed path, while at the same time the automotive body and the body panels are treated. After the automotive body and the feed jig are fed respectively along the automotive body feed path and the body panel feed path which are joined to the first feed panel, the feed panels and the automotive body are introduced into the second feed path to which the automotive body feed path and the body panel feed path are joined. The process of removing the body panels from the automotive body, the process of treating the automotive body and the body panels, and the process of installing the body panels on the automotive body can successively be carried out.

The feed jig from which the body panels have been removed in the installation zone is fed back to the first feed path through the jig feed path that is branched from the second feed path and joined to the first feed path. Therefore, the feed jig can repeatedly be used in the above processes which are successively effected.

According to the method of the second aspect of the present invention, when the body panels installed on the automotive body are to be removed, the process of removing the body panels and the process of the installing the removed body panels on the feed jig can successively be carried out in the body panel removal station on the feed path.

In the body panel removal station, it is possible to remove the body panels, together with the fasteners, from the automotive body and also to install the body panel on the automotive body with the fasteners.

According to the method of the third aspect of the present invention, when the body panels which have been removed from the automotive body and installed on the feed jig are to be installed again on the automotive body, the process of removing the body panels from the feed jig and the process of installing the body panels on the automotive body can also successively be carried out in the body panel removal station on the feed path, as with the second aspect of the invention.

It is also possible in the body panel removal station to remove the body panels, together with the fasteners, from the automotive body and also to install the body panel on the automotive body with the fasteners.

According to the method of the fourth aspect of the present invention, when the body panels which have been removed from the automotive body and installed on the feed jig are to be coated while being fed with the feed jig, the body panels are oriented substantially vertically with the inner panel surfaces facing outwardly with respect to the feed jig, and then the inner panel surfaces are simultaneously coated by the coating robot. Thereafter, the body panels are simultaneously about the axes into the substantially horizontal posture with the outer panel surfaces facing upwardly, and then the outer panel surfaces are simultaneously coated by the reciprocator. Therefore, the inner and outer panel surfaces of the body panels can successively be coated. It is possible to coat the inner and outer panel surfaces in their posture which is suitable for coating purpose, with the coating means which are also suitable for their coating operation.

After the outer panel surfaces of the body panels have been coated, the body panels are turned about the axes into the substantially horizontal posture with the outer panel surfaces facing downwardly. The body panels are then baked and dried in their horizontal posture. Dust particles and other foreign matter are therefore prevented from being applied to the outer panel surfaces of the body panels.

According to the method of the fifth aspect of the present invention, when the body panels which have been removed from the automotive body and installed on the feed jig are to be coated while being fed with the feed jig, the body panels are oriented substantially horizontally with the inner panel surfaces facing upwardly, and then the inner panel surfaces are simultaneously coated by the first reciprocator. Thereafter, the body panels are simultaneously about the axes into the substantially horizontal posture with the outer panel surfaces facing upwardly, and then the outer panel surfaces are simultaneously coated by the second reciprocator. Therefore, the inner and outer panel surfaces of the body panels can successively be coated. It is possible to coat the inner and outer panel surfaces with the coating means which are simple in construction.

After the outer panel surfaces of the body panels have been coated, the body panels are turned about the axes into the substantially horizontal posture with the outer panel surfaces facing downwardly. The body panels are then baked and dried in their horizontal posture. Dust particles and other foreign matter are therefore prevented from being applied to the outer panel surfaces of the body panels.

According to the method of the sixth aspect of the present invention, when the body panels which have been removed from the automotive body and installed on the feed jig and the automotive body from which the body panels have been removed are to be coated while they are being fed, the body panels are mounted on the feed jig in the same posture and relative positional relationship as they are installed on the automotive body. Thus, the automotive body and the body panels can be coated while they are being fed along the same feed path. The engine hood and the trunk lid, among other body panels, are supported on the feed jig at substantially the same height as the uppermost ends of the doors installed on the feed jig. Therefore, paint mists which float in a relatively high space region when the doors and the automotive body roof are coated are prevented from being applied to the engine hood and the trunk lid.

According to the apparatus for removing and installing the body panels, when the body panels are to be removed from the automotive body and installed on the feed jig, the automotive body and the feed jig are successively fed intermittently along the feed path, and positioned successively in the removing and installing stations. When the automotive body is positioned in the door removing and installing station, for example, the door removing and installing devices move laterally of the automotive body toward the doors, remove and grip the doors in the substantially vertical posture, and are retracted away from the automotive body. When the feed jig disposed upstream of and following the automotive body is positioned in the door removing and installing station, the door removing and installing devices which grip the doors in their vertical posture are moved toward the door mounting means on the feed jig, and install the doors on the door mounting means in the substantially vertical posture which is the same as they are installed on the automotive body. In the engine hood removing and installing station and the trunk lid removing and installing station, the engine hood removing and installing device and the trunk lid removing and installing device are lowered respectively toward the engine hood and the trunk lid on the automotive body which is positioned in these stations, and elevated after having removed the engine hood and the trunk lid in their horizontal posture. Then, the engine removing and installing device and the trunk lid removing and installing device lower the engine hood and the trunk lid, respectively, toward the engine hood mounting means and the trunk lid mounting means, respectively, on the feed jig which is positioned in these stations. The engine removing and installing device and the trunk lid removing and installing device now install the engine hood and the trunk lid, respectively, on the engine mounting means and the trunk lid mounting means while keeping substantially the same horizontal posture as they are installed on the automotive body.

To remove the body panels from the feed jig and install them on the automotive body, the feed jig and the automotive body are fed down the feed path with the automotive body being positioned upstream of the feed jig. In the removing and installing stations, the body panels are removed from the feed jig and installed on the automotive body while keeping their posture.

When the mounting means on the feed jig are arranged to be able to mount the body panels thereon in the same posture as they are installed on the automotive body, it is possible to combine the removing and installing stations into a single removing and installing station, in which all the body panels can be removed and installed.

The mounting means on the feed jig may be angularly movable about the shafts and support the body panels substantially parallel to each other. In this arrangement, if the combination of the engine hood removing and installing station and the trunk lid removing and installing station is positioned upstream of the door removing and installing station, when the body panels are to be removed from the automotive body and installed on the feed jig, the engine hood and the trunk lid are first removed from the automotive body and then installed on the feed jig in the substantially horizontal posture in their combined removing and installing station. At this time, since the mounting means can mount the body panels only parallel to each other, when the engine hood and the trunk lid are mounted substantially horizontally on the feed jig, the doors cannot be mounted on the door mounting means on the feed jig unless the doors are oriented horizontally. After the engine hood and the trunk lid have been mounted on the feed jig, the mounting means are angularly moved about the axes to turn the engine hood and the trunk lid into the vertical posture, so that the doors can be mounted vertically on the feed jig. The doors, which have been removed from the automotive body in the substantially vertical posture in the door removing and installing station, are installed on the door mounting means while keeping their posture. The body panels are now supported on the feed jig substantially parallel to each other.

When the body panels are to be removed from the feed jig and installed on the automotive body, the body panels mounted on the feed jig are turned into the horizontal posture, and the engine hood and the trunk lid are removed from the feed jig and installed on the automotive body in the first removing and installing station. Then after the door mounting means are angularly moved to orient the doors vertically, the doors are removed from the feed jig and installed on the automotive body in the door removing and installing station. Even if the first removing and installing station is positioned downstream of the door removing and installing station, the body panels can be removed and installed in the same manner as described above.

When the door removing and installing devices are to remove and install the doors which are open in the substantially vertical posture, before the feed jig or the automotive body on which the doors are installed is introduced into the door removing and installing station, the doors are opened, and then the opened doors are removed and installed by the door removing and installing devices. The door removing and installing devices can immediately remove and install the doors in positions where the doors are installed on the feed jig or the automotive body.

With the door openers disposed on the opposite sides of the feed path upstream of the door removing and installing station, the doors on the automotive body or the feed jig can automatically be opened by the door openers before the automotive body or the feed jig is introduced into the door removing and installing station.

According to the feed jig of one aspect of the present invention, the mounting means are angularly movable with one of the shafts, and the body panels are mounted on the mounting means substantially parallel to each other along the feeding direction. When the shafts are turned, the inner and outer panel surfaces of the body panels can be directed, e.g., upwardly, so that they can conveniently be coated. For transfer of the body panels between the feed jig and the automotive body, the shafts are turned into positions where the mounting means mount thereon the body panels in their substantially vertical posture. Thus, the doors can be transferred between the feed jig and the automotive body while maintaining the vertical posture thereof. The shafts are also turned into positions where the mounting means mount thereon the body panels in their substantially horizontal posture. Thus, the engine hood and the trunk lid can be transferred between the feed jig and the automotive body while maintaining the horizontal posture thereof. Since the mounting means are disposed on the feed jig in a relative positional relationship which substantially corresponds to the relative positional relationship of the body panels to the automotive body, the body panels can be transferred between the feed jig and the automotive body while substantially keeping the relative positional relationship of the body panels.

The mounting means, with the body panels supported thereon in the substantially horizontal posture, may be angularly movable with the shafts into positions in which the body panels on the mounting means on the opposite lateral sides are vertically superposed but spaced from each other. With such an arrangement, when the coated body panels are to be baked and dried, for example, the shafts are turned about their own axes to position the body panels in vertically superposed, but spaced relation. Therefore, the feed jig may be reduced in size during operation, and may be fed through a relatively small drying furnace in which the coating layers on the body panels can be baked and dried.

The shafts are supported on the swingable shafts by the arms. When the shafts are turned about the swingable shafts by the arms, the body panels on the opposite lateral sides are vertically superposed but spaced from each other.

The motion imparting members are coupled respectively to the shafts. When drive forces are applied from an external source to the motion imparting members, the mounting means are angularly moved with the shafts. An actuator such as a motor for angularly moving the mounting means is not required to be mounted on the feed jig. Therefore, the feed jig is simple in structure.

According to the feed jig of another aspect of the present invention, since the mounting means are angularly movable about the shafts, the posture of the body panels which are mounted on the respective mounting means can be varied when the mounting means are angularly moved, and the inner and outer panel surfaces of the body panels can be coated in their posture which is suitable for coating operation. Inasmuch as the mounting means are disposed on the feed jig in a relative positional relationship which substantially corresponds to the relative positional relationship of the body panels to the automotive body the body panels can be transferred between the feed jig and the automotive body while substantially keeping the relative positional relationship of the body panels.

Where the mounting means are arranged to mount the body panels simultaneously in substantially the same posture as they are installed on the automotive body, the body panels can be transferred between the feed jig and the automotive body while maintaining not only their relative positional relationship but also their posture. As the relative positional relationship and the posture of the body panels mounted on the feed jig are approximately the same as those of the body panels with respect to the automotive body, the automotive body and the body panels can be coated while being fed along the same feed path.

If the mounting means are coupled for rotation with each other, then body panels mounted on the mounting means can simultaneously be angularly moved when one of the mounting means is angularly moved.

In such an arrangement, the motion imparting member may be coupled to one of the mounting means. When drive forces are applied from an external source to the motion imparting member, the mounting means are simultaneously angularly moved. An actuator such as a motor for angularly moving the mounting means is not required to be mounted on the feed jig. Therefore, the feed jig is simple in structure.

The engine hood mounting means is coupled for rotation with one of the door mounting means, and and the trunk lid mounting means is coupled for rotation with the other door mounting means. With such an arrangement, one of the doors and the engine hood can be angularly moved in unison with each other, and the other door and the trunk lid can be angularly moved in unison with each other. Therefore, these body panels can be angularly moved and positioned into their desired posture with relatively small drive forces.

Furthermore, the motion imparting members are coupled, one to one of the door mounting means and the engine hood mounting means which are angularly movable together, and the other to one of the door mounting means and the trunk lid mounting means which are angularly movable together. When drive forces are applied from an external source to the motion imparting members, the mounting means can be angularly moved. Since an actuator such as a motor for angularly moving the mounting means is not required to be mounted on the feed jig, the feed jig is simple in structure.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 7 and 8 are plan and side elevational views, respectively, of the body panel removing and installing apparatus;

DETAILED DESCRIPTION OF THE PREFERRED EMBODIMENTS

Figure 1:
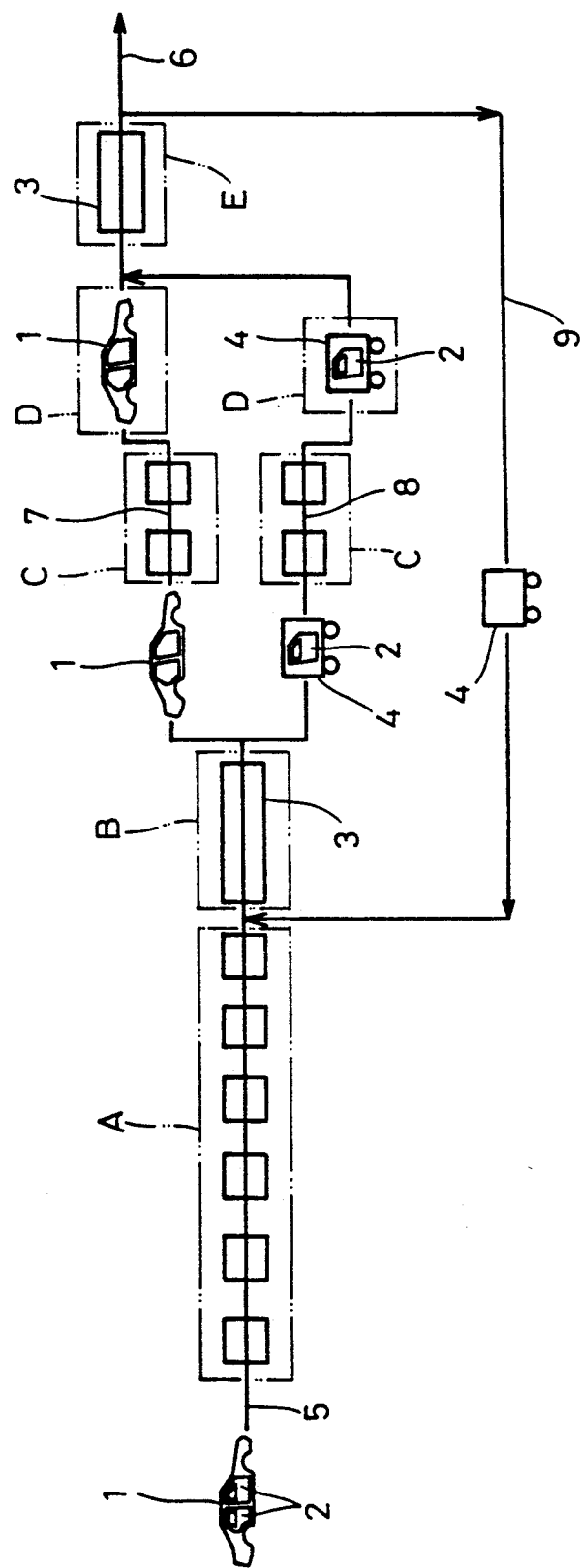
FIG. 1 is a schematic view showing an automobile coating line which employs a method of assembling body panels and an automotive body together, an apparatus for removing body panels from and installing body panels on an automotive body in the assembling method, and also a feed jig for holding and feeding body panels in the assembling method, according to a first embodiment of the present invention.

FIG. 1 shows an automobile coating line which includes a pretreatment zone A where an automotive body 1 and body panels 2 such as doors detachably attached to the automotive body 1 are successively preteated, dried, primed, dried, sealed, and dried, a removal zone B where the body panels 2 are removed from the automotive body 1 and mounted on a feed jig 4 by a body panel removing and installing apparatus 3, a pair of coating zones C where the automotive body 1 and the body panels 2 ar separately coated and dried, a pair of trimming zones D where the automotive body 1 and the body panels 2 are separately trimmed or furnished with interior fittings, and an installation zone E where the body panels 2 are removed from the feed jig 4 and installed back on the automotive body 1 by a body panel removing and installing apparatus 3 which is of the same structure as that of the body panel removing and installing apparatus 3 in the removal zone B.

First and second feed paths 5, 6 for feeding the automotive body 1 with the body panels 2 attached thereto extend respectively in the upstream and downstream regions of the automobile coating line. An automotive body feed path 7 and a door panel feed path 8 are branched from the downstream end of the first feed path 5, extend parallel to each other, and are joined to the upstream end of the second feed path 6. The feed jig 4 is fed from the installation zone E back to the removal zone B along a jig feed path 9.

The pretreatment zone A and the removal zone B are positioned successively along the first feed path 5 from its upstream end. The coating zone C and the trimming zone D are positioned successively along each of the feed paths 7, 8 from their upstream end. The installation zone E is disposed on the second feed path 6. The jig feed path 9 is branched from the second feed path 6 downstream of the installation zone E back to the upstream region of the coating line, where it is joined to the first feed path 5 between the pretreatment zone A and the removal zone B.

The automotive body 1 with the body panels 2 installed thereon is fed along the first feed path 5. In the pretreatment zone A, the automotive body 1 and the body panels 2 are pretreated, e.g., primed and dried. Then, the body body panels 2 are removed from the automotive body 1 in the removal zone B. Then, the automotive body 1 is fed along the automotive body feed path 7, and the body panels 2 are fed along the body panel feed path 8. In the coating zones C, the automotive body 1 and the body panels 2 are separately coated. In the trimming zones, the automotive body 1 and the body panels 2 are separately trimmed. Thereafter, the automotive body 1 and the body panels 2 are fed along the second feed path 6, and the body panels 2 are installed back on the automotive body 1 in the installation zone E. The body panels 2 which are detached from the automotive body 1 in the removal zone B are mounted on and fed with the feed jig 4 along the body panel feed path 8 from the removal zone B to the installation zone E. The feed jig 4 circulates along the feed paths 5, 8, 6, 9, so that it is repeatedly used to feed the body panels 2 from the removal zone B to the installation zone E.

In the automobile coating line, the automotive body 1 is supported on a carriage (not shown) which is movable along the feed paths 5, 7, 6 by chain drives or the like. Likewise, the feed jig 4 is supported on a carriage (not shown) which is movable along the feed paths 5, 8, 6, 9 by chain drives or the like.

In the illustrated embodiment, the body panels 2 include an engine hood, a trunk lid, front and rear doors on left and right sides, left and right front fenders.

The feed jig 4 will be described in detail below with reference to FIGS. 2 through 6.

Figure 2:
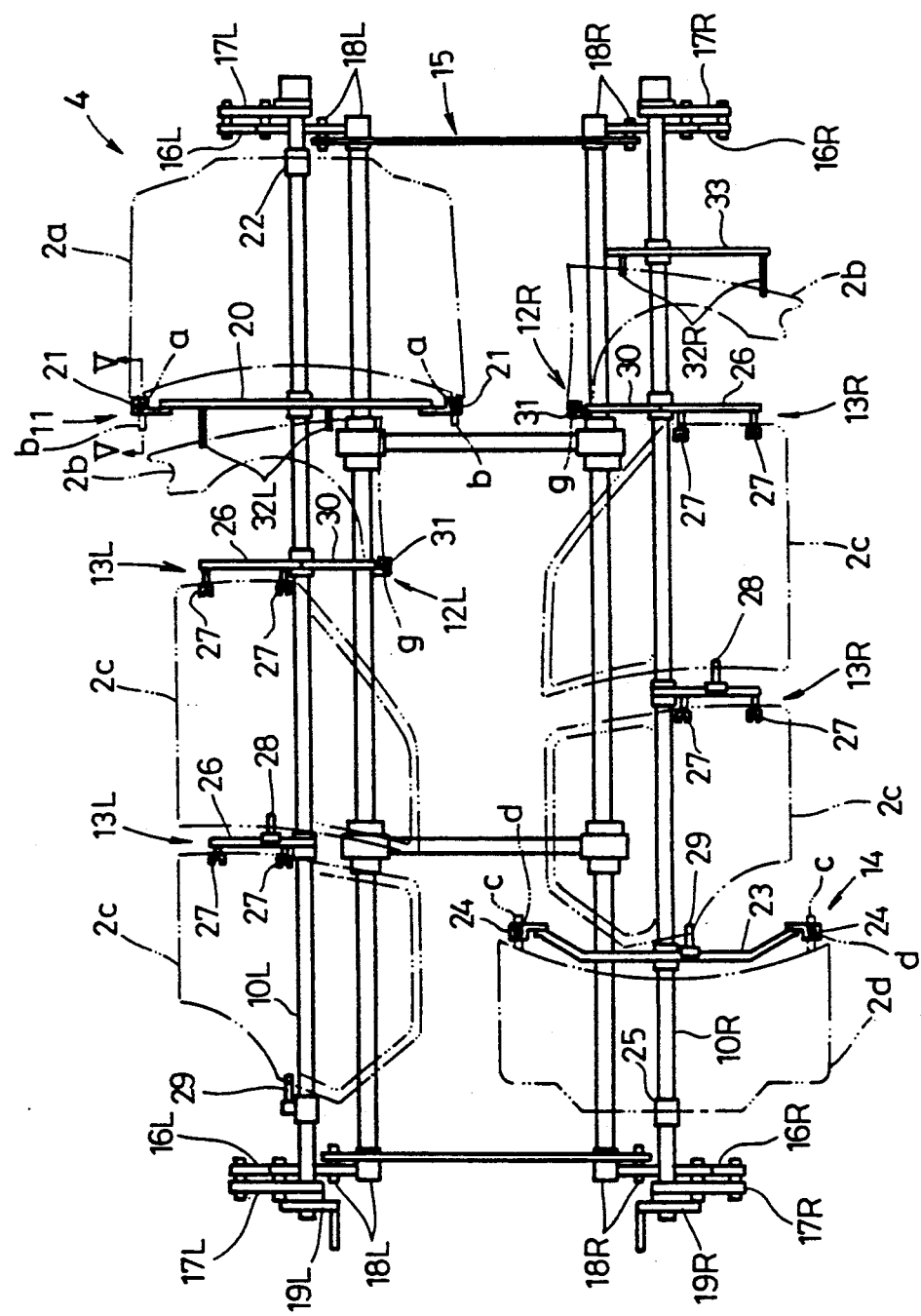
FIGS. 2, 3, and 4 are plan, side elevational, and rear elevational views, respectively, of the feed jig.
Figure 3:
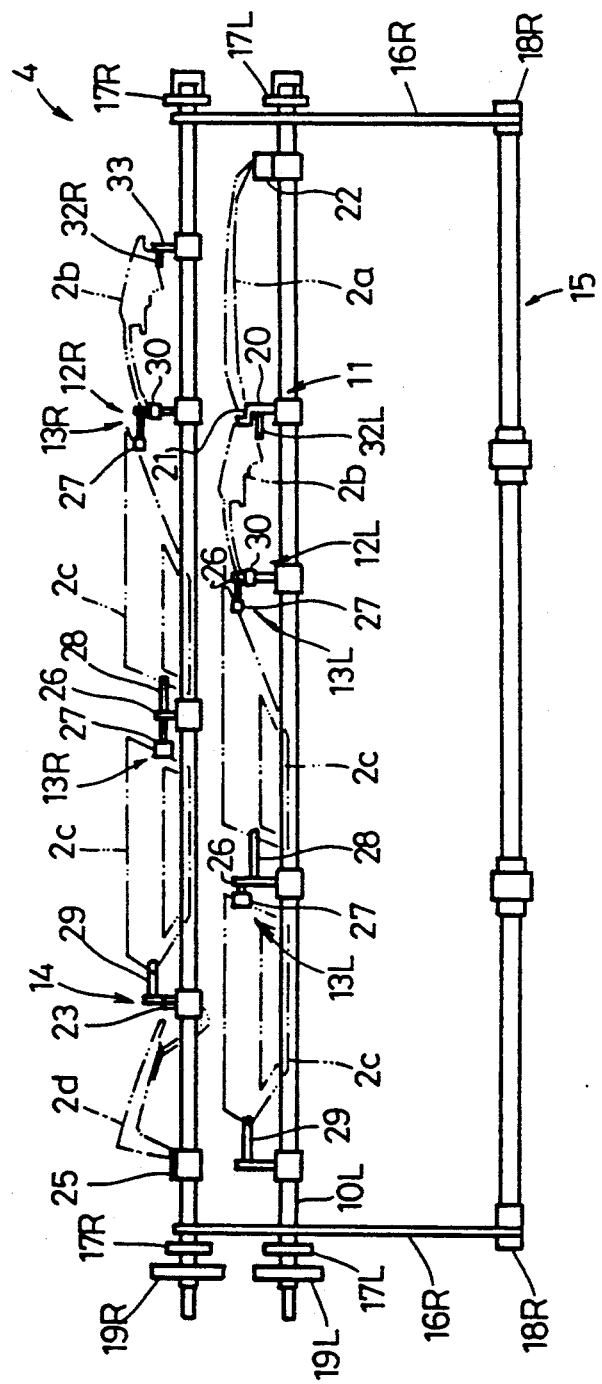
Figure 4:
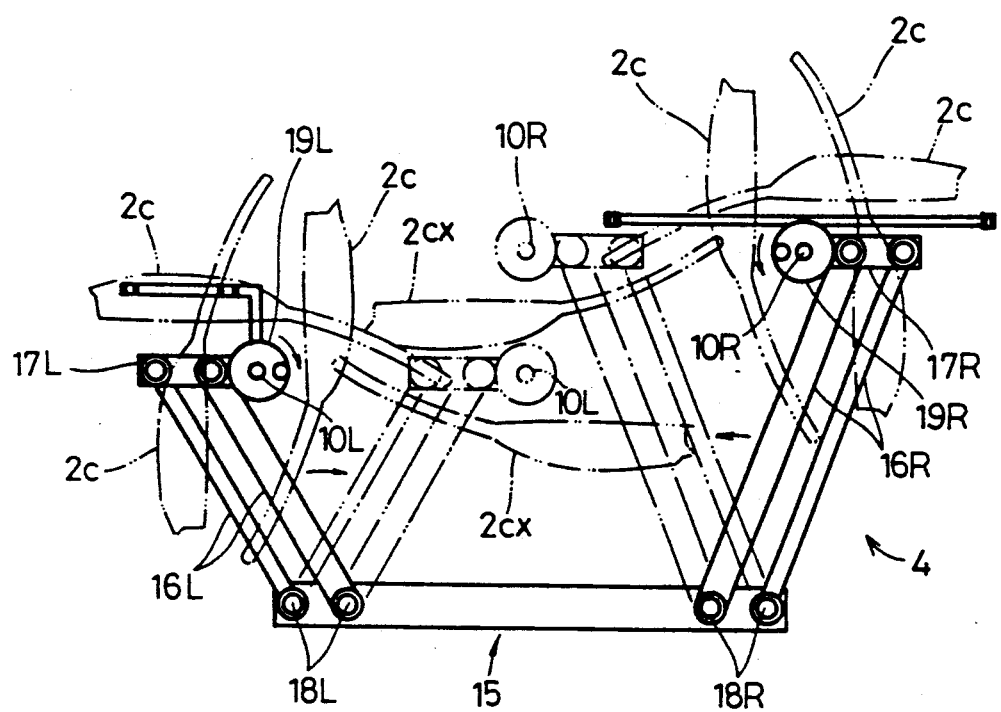
Figure 5:
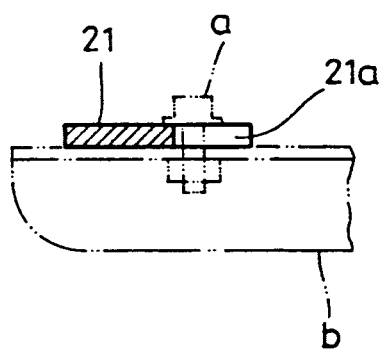
FIG. 5 is a cross-sectional view taken along line V V of FIG. 2.
Figure 6:
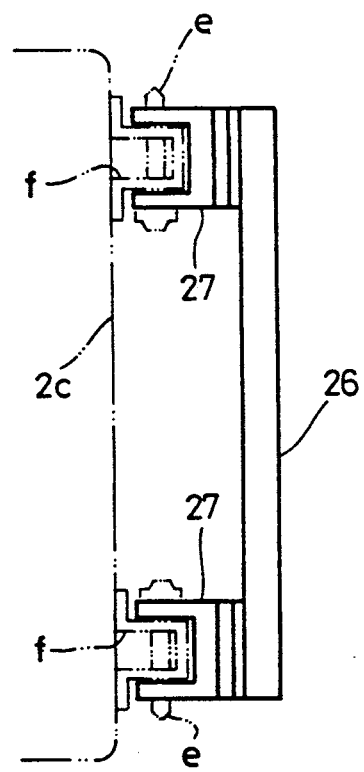
FIG. 6 is an enlarged view of a portion of the feed jig shown in FIG. 2.

As shown in FIGS. 2 through 4, the feed jig 4 has a pair of longitudinal shafts 10L, 10R angularly movable about their own axes and disposed in upper opposite sides thereof, an engine hood mounting means 11 for mounting an engine hood 2a, a fender mounting means 12L for mounting a left front fender 2b, a pair of door mounting means 13L for mounting left front and rear doors 2c, the mounting means 11, 12L, 13L being disposed on the shaft 10L for rotation therewith and arranged successively from its front end in the order named, a fender mounting means 12R for mounting a right front fender 2b, a pair of door mounting means 13R for mounting right front and rear doors 2c, and a trunk lid mounting means 14 for mounting a trunk lid 2d, the mounting means 12R, 13R, 14 being disposed on the shaft 1RL for rotation therewith and arranged successively from its front end in the order named. These mounting means 11, 12L, 12R, 13L, 13R, 14 are positioned such that they substantially correspond in position to the body panels 2 which are installed on the automotive body 1.

As shown in FIG. 4, the opposite ends of the shafts 10L, 10R are rotatably supported by shaft supports 17L, 17R which are pivotally mounted on the upper ends of pairs of arms 16L, 16R that extend obliquely upwardly from front and rear ends of a lower frame 15 of the feed jig 4 on its opposite sides. The shaft 10R is higher in position than the shaft 10L. The arms 16L, 16R have lower ends supported on swing shafts 18L, 18R, respectively, which are longitudinally mounted on the lower frame 15. The arms 16L, 16R and the shafts 10L, 10R are swingable about the swing shafts 18L, 18R. More specifically, the arms 16L, 16R are swingable from respective positions, indicated by the solid lines, in which the shafts 10L, 10R are remotely spaced from each other transversely across the feed jig 4, toward positions, indicated by the imaginary lines, in which the shafts 10L, 10R are vertically superposed but spaced from each other.

As shown in FIGS. 2 and 3, two motion imparting members 19L, 19R to which drive forces for angularly moving the shafts 10L, 10R are applied are axially movably mounted on the shafts 10L, 10R, respectively, through axial splines. The motion imparting members 19L, 19R, as they are displaced toward the shaft supports 17L, 17R, are detachably held in engagement with the shaft supports 17L, 17R by pins or the like (not shown). When the motion imparting members 19L, 19R engage the shaft supports 17L, 17R, the shafts 10L, 10R cannot be angularly moved about their own axes. When the motion imparting members 19L, 19R are disengaged from the shaft supports 17L, 17R upon axial movement away therefrom along the shafts 10L, 10R, the shafts 10L, 10R can rotate with the motion imparting members 19L, 19R.

As shown in FIG. 2, the engine hood mounting means 11 has a mounting rod 20 fixed at its center to a front portion of the shaft 10L for rotation therewith and extending perpendicularly to the shaft 10L. The mounting rod 20 has on its opposite ends respective plate-like mounts 21 to which the engine hood 2a can be fastened by bolts a (FIG. 5) that are also used to install the engine hood 2a on the automotive body 1.

More specifically, the engine hood 2a is installed on the automotive body 1 by the bolts a which fasten hinge brackets b (one indicated by the imaginary lines in FIG. 5) fixed to the rear edge of the engine hood 2a on its opposite sides. When the bolts a are unfastened from the automotive body 1, the engine hood 2a together with the hinge brackets b can be detached from the automotive body 1. Each of the mounts 21 has a recess 21a through which the bolt a extends from the upper surface of the mount 21 into the bracket b and is fastened in place with an attachment portion of the hinge bracket b, which is to be fastened to the automotive body 1, being held against the lower surface of the mount 21. As illustrated in FIGS. 2 and 3, a holder 22 which is made of a magnetic material such as a magnet for magnetically attracting the lower surface of a front end of the engine hood 2a is fixedly mounted on the shaft 10L forwardly of the mounting rod 20. Therefore, the holder 22 is angularly movable with the shaft 10L.

The engine hood 2a is mounted on the engine hood mounting means 11 as follows: After the engine hood 2a is detached from the automotive body 1, the attachment portions of the hinge brackets b of the engine hood 2a are held against the lower surfaces of the mounts 21. Then, the bolts a are inserted through the recesses 21a into the hinge brackets b and nuts are tightened over the bolts a, so that the hinge brackets b are firmly fastened to the mounts 21, respectively. At this time, the lower surface of the front end of the engine hood 2a is magnetically attracted to the holder 22. In this manner, the engine hood 2a is held in position substantially parallel to the shaft 10L and the mounting rod 20 for angular movement therewith, as shown in FIGS. 2 and 3.

As shown in FIG. 2, the trunk lid mounting means 14 has a mounting rod 23 fixed at its center to a rear portion of the shaft 10R for rotation therewith and extending perpendicularly to the shaft 10R. The mounting rod 23 has on its opposite ends respective mounts 24 to which the trunk lid 2d can be fastened by bolts d that are also used to attach hinge brackets c on the front end of the trunk lid 2d on its opposite sides to the automotive body 1. As illustrated in FIGS. 2 and 3, a holder 25 which is made of a magnetic material such as a magnet for magnetically attracting the lower surface of a rear end of the trunk lid 2d is fixedly mounted on the shaft 10R rearwardly of the mounting rod 23. Therefore, the holder 25 is angularly movable with the shaft 10R.

The trunk lid 2d is mounted on the trunk lid mounting means 14 as follows: After the trunk lid 2d is detached from the automotive body 1, the the hinge brackets c of the trunk lid 2d are fastened to the mounts 24 by the bolts d. At this time, time, the lower surface of the rear end of the trunk lid 2d is magnetically attracted to the holder 25. Now, the trunk lid 2d is held in position substantially parallel to the shaft 10 and the mounting rod 23 for angular movement therewith, as shown in FIGS. 2 and 3.

As shown in FIG. 2, the four door mounting means 13L, 13R have mounting rods 26 extending parallel to the mounting rods 20, 23 of the engine hood mounting means 11 and the trunk lid mounting means 14 and attached to the shafts 10L, 10R for rotation therewith, and hinges 27 disposed on the opposite ends of the mounting rods 26 and to which the doors 2c can openably and closably be attached by hinge pins e (FIG. 6) that are used to install the doors 2c to the automotive body 1.

Each of the doors 2c has hinges f (FIG. 6) fixed to its front end. The hinges f are attached to hinges (not shown) of the automotive body 1 by the hinge pins e. The door 2c can be detached from the automotive body 1 when the hinge pins e are removed from the automotive body 1. The hinges 27 of the door mounting means 13L, 13R are structurally identical to the door hinges of the automotive body 1. As shown in FIGS. 2 and 3, the mounting rods 26 corresponding to the rear doors 2c have holders 28 made of a magnetic material for magnetically attracting the rear ends of the front doors 2c. Likewise, magnetic holders 29 for magnetically attracting the rear ends of the rear doors 2c are mounted on the shaft 10L and the mounting rod 23, respectively, for rotation therewith.

The doors 2c are supported on the respective door mounting means 13L, 13R as follows: After the doors 2c are detached from the automotive body 1, the hinges f of the doors 2c are coupled to the hinges 27 through the hinge pins e. The rear ends of the doors 2c are also magnetically attracted to the holders 28, 29. The doors 2c are openably and closably supported substantially parallel to the shafts 10L, 10R and the mounting rod 23 for angular movement therewith, as shown in FIGS. 2 and 3.

As shown in FIG. 2, the fender mounting means 12L, 12R have mounting rods 30 joined to the mounting rods 26 of two of the door mounting means 13L, 13R and extending from the shafts 10L, 10R away from the mounting rods 26. As with the engine hood mounting means 11 and the trunk lid mounting means 14, the mounting rods 30 have on their distal ends respective mounts 31 to which projecting ends of the fenders 2b can be fixed by bolts g that are used to fasten the fenders 2b to the automotive body 1. As shown in FIGS. 2 and 3, holders 32 made of a magnetic material for magnetically attracting the upper end of the left fender 2b are attached to the mounting rod 20 of the engine hood mounting means 11 forwardly of the mounting rod 30. Similarly, magnetic holders 32R for magnetically attracting the upper end of the right fender 2b are attached to an arm 33 which is secured transversely to the shaft 10R.

After the fenders 2b are removed from the automotive body 1, the projecting ends of the fenders 2b are fastened to the mounts 31 by the bolts g, and the upper ends of the fenders 2b are magnetically attracted to the holders 32L, 32R. The fenders 2b are now supported substantially parallel to the shafts 10L, 10R and the mounting rods 30 for angular movement therewith.

In the feed jig 4 thus constructed, the mounting rods 20, 30, 36 of the mounting means 11, 12L, 13L spaced along the shaft 10L lie parallel to each other, and the mounting rods 30, 26, 23 of the mounting means 12R, 13R, 14 spaced along the shaft 10R lie parallel to each other. Therefore, the shafts 10L, 10R may be angularly moved to bring all the mounting rods 20, 23, 26, 30 into a horizontal condition as shown in FIG. 2. When the shafts 10L, 10R are angularly moved 90° from the horizontal condition, all the mounting rods 20, 23, 26, 30 are vertically oriented.

To mount the engine hood 2a and the trunk lid 2d on the feed jig 4, the mounting rods 20, 23, 26, 30 are brought into the horizontal condition. The engine hood 2a and the trunk lid 2d can now be supported on the engine hood mounting means 11 and the trunk lid mounting means 14 in substantially the same horizontal posture as they are installed on the automotive body 1. To mount the doors 2c and the fenders 2b on the feed jig 4, the mounting rods 20, 23, 26, 30 are vertically oriented. The doors 2c and the fenders 2b can now be supported on the door mounting means 13L, 13R and the fender mounting means 12L, 12R in substantially the same vertical posture as they are installed on the automotive body 1. The body panels 2 which are thus mounted on the feed jig 4 are parallel to each other in the horizontal posture when all the mounting rods 20, 23, 26, 30 lie horizontal, and parallel to each other in the vertical posture when all the mounting rods 20, 23, 26, 30 lie vertical.

On the fender mounting means 12L, 12R, the fenders 2b are angularly displaced 90° in their plane from the posture in which they are installed on the automotive body 1.

While the body panels 2 are being supported on the feed jig 4, the shafts 10L, 10R may be rotated about their own axes between a horizontal posture in which the outer panel surfaces of the body panels 2 are directed upwardly, another horizontal posture in which the inner panel surfaces of the body panels 2 are directed upwardly, a vertical posture in which the outer panel surfaces are directed outwardly with respect to the feed jig 4, and another vertical posture in which the inner panel surfaces are directed outwardly with respect to the feed jig 4, as shown by the doors 2c in FIG. 4.

Furthermore, if the body panels 2 are mounted on the feed jig 4 in one of the horizontal postures in which the inner panel surfaces are directed upwardly, then when the arms 16L, 16R are angularly moved, as indicated by the imaginary lines in FIG. 4, the body panels 2 on the shaft 10L and the body panels 2 on the shaft 10R can be vertically superposed but spaced from each other, as shown by doors 2cx in FIG. 4.

The body panel removing and installing apparatus 3 will be described below with reference to FIGS. 1 and 7 through 9.

Figure 7:
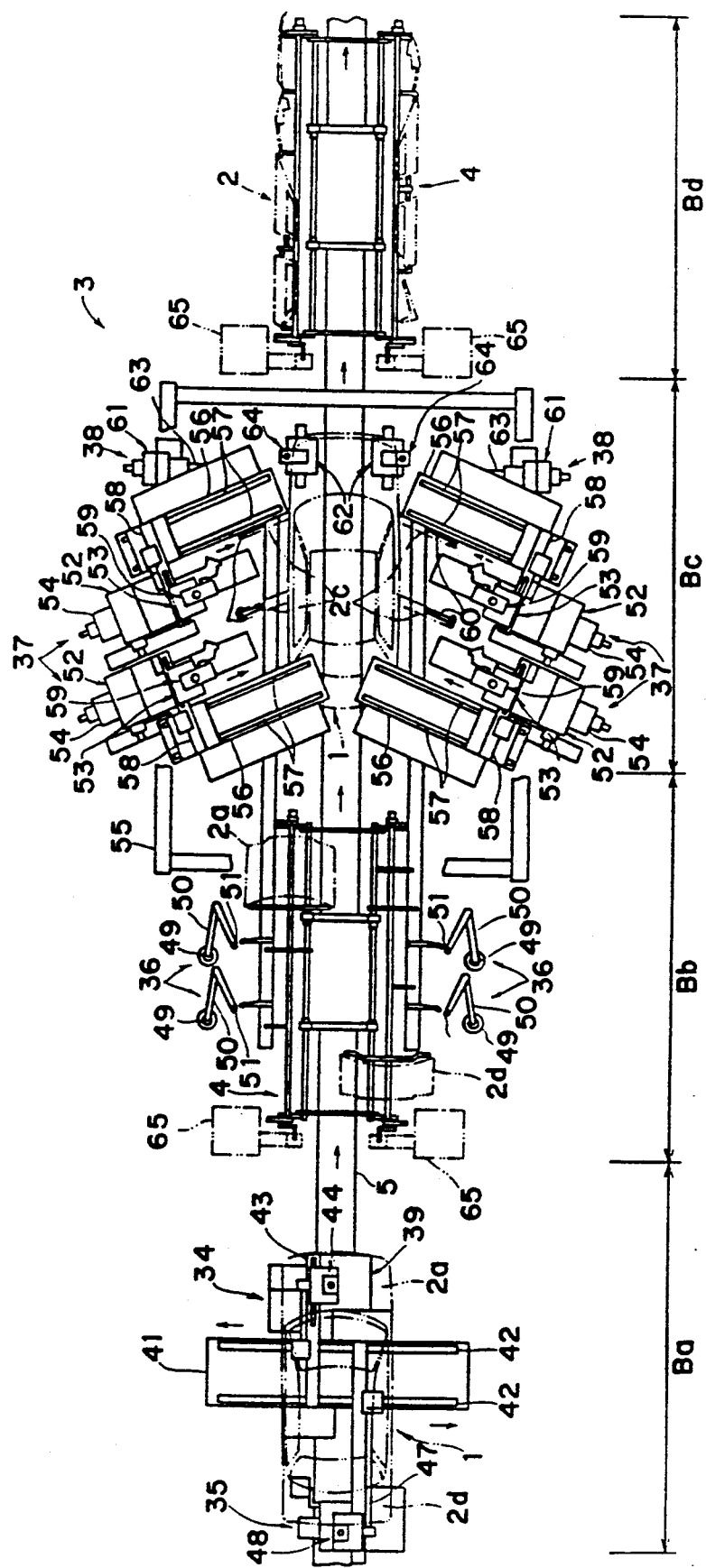
Figure 8:
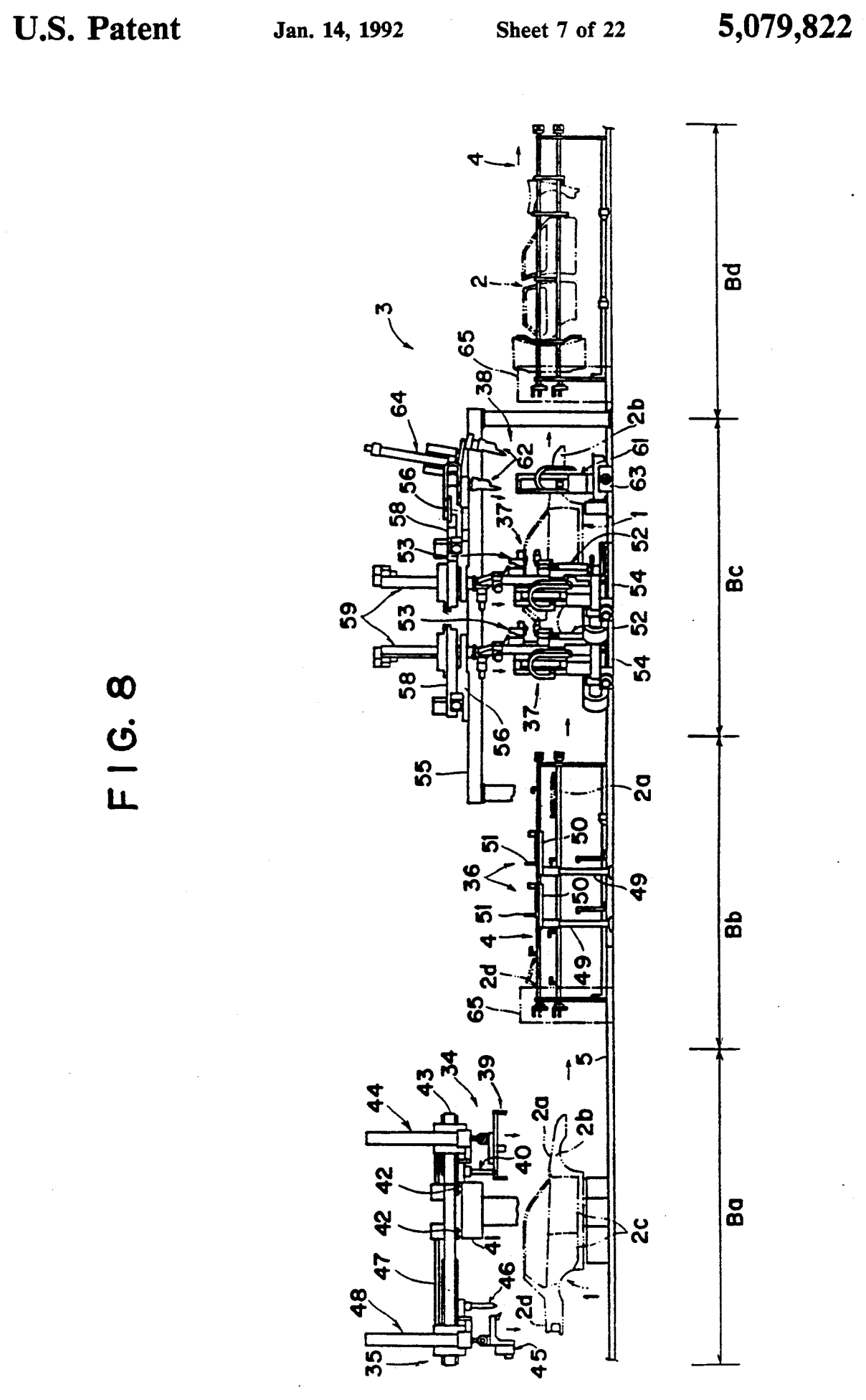
Figure 9:
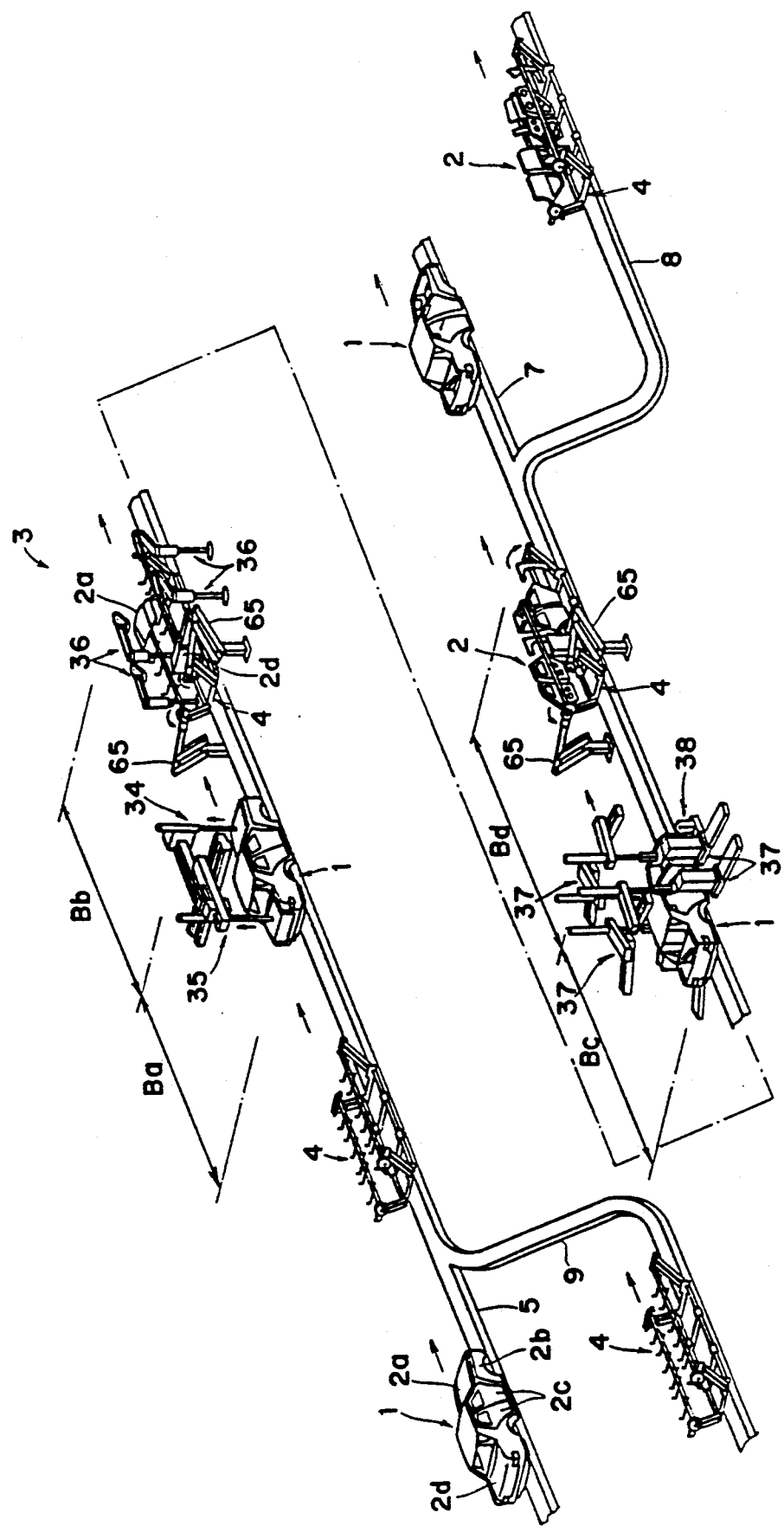
FIGS. 9 through 12 are perspective views showing respective sections of the automobile coating line and illustrative of operation of these sections.

In FIGS. 7 through 9, the removal zone B includes first through fourth working stations Ba, Bb, Bc, Bd successively arranged downstream along the feed path 5 at equally spaced intervals. The first working station Ba has an engine hood removing and installing device 34 for removing and installing the engine hood 2a from and on the automotive body 1 and a trunk lid removing and installing device 35 for removing and installing the trunk lid 2d from and on the automotive body 1, the devices 34, 35 being disposed in an upstream region of the feed path 5. The second working station Bb has two pairs of door openers 36, one pair on each side of the feed path 5, for opening the closed doors 2c that are installed on the automotive body 1. The third working station Bc has two pairs of door removing and installing devices 37, one pair on each side of the feed path 5, for removing and installing the doors 2c from and on the automotive body 1. The third working station Bc also has a pair of fender removing and installing devices 38, one on each side of the feed path 5, for removing and installing the fenders 2b from and on the automotive body 1.

In the removal zone the feed jig 4 is delivered from the jig feed path 9 at a position upstream of the automotive body 1 which has been fed along the feed path 5 from the pretreatment zone A, with the body panels 2 installed on the automotive body 1, as shown in FIG. 1. Automotive bodies 1 and feed jigs 4 are intermittently fed alternately along the feed path at equally spaced intervals. As shown in FIG. 9, the automotive bodies 1 and the feed jigs 4 are successively positioned in the first through fourth working stations Ba through Bd while being fed along the feed path 5.

As shown in FIGS. 7 and 8, the engine hood removing and installing device 34 has a gripper means 39 for removably gripping the engine hood 2a, and a bolt removing and installing means 40 for removing and installing bolts a by which the engine hood 2a is installed on the automotive body 1, the means 39, 40 being positioned above the engine hood 2a of the automotive body 1 which has been positioned in the first working station Ba. The gripper means 39 and the bolt removing and installing means 40 are supported on an end of an arm frame 43 which is movable on and along rails 42 supported on an upper surface of a main frame 41 disposed over the feed path 5 and extending across the feed path 5 in the first working station Ba. The arm frame 43 extends downstream of the main frame 41 and along the feed path 5. The gripper means 39 and the bolt removing and installing means 40 are vertically movable by a lifting/lowering means 44. When the feed jig 4 is positioned in the first working station Ba, the gripper means 39 and the bolt removing and installing means 40 are moved along the rails 42 by the arm frame 43 until they are positioned above the engine hood mounting means 11 of the feed jig 4.

The trunk lid removing and installing device 35 has a gripper means 45 for removably gripping the trunk lid 2d, and a bolt removing and installing means 46 for removing and installing bolts d by which the trunk lid 2d is installed on the automotive body 1. The gripper means 45 and the bolt removing and installing means 46 are supported on an end of an arm frame 47 which is movable on and along the rails 42 on the main frame 41. The arm frame 47 extends upstream of the main frame 41 and along the feed path 5. The gripper means 45 and the bolt removing and installing means 46 are vertically movable by a lifting/lowering means 48. When the feed jig 4 is positioned in the first working station Ba, the gripper means 45 and the bolt removing and installing means 46 are moved along the rails 42 by the arm frame 47 until they are positioned above the trunk lid mounting means 14 of the feed jig 4.

When the automotive body 1 with the body panels 2 installed arrives at the first working station Ba, the gripper means 39, 45 and the bolt removing and installing means 40, 46 are lowered toward the engine hood 2a and the trunk lid 2d, respectively, by the lifting/lowering means 44, 48. After the engine hood 2a and the trunk lid 2d are gripped by the respective gripper means 39, 45, the bolts a, d are removed from the automotive body 1 and held by the bolt removing and installing means 40, 46. Then, the gripper means 39, 45 and the bolt removing and installing means 40, 46 are elevated to detach the engine hood 2a, the trunk lid 2d, and the bolts a, d away from the automotive body 1. At this time, the gripper means 39, 45 of the engine hood removing and installing device 34 and the trunk lid removing and installing means 35 hold the engine hood 2a and the trunk lid 2d in substantially the same horizontal posture as they are installed on the automotive body 1.

When the feed jig 4, following the automotive body 1 from which the engine hood 2a and the trunk lid 2d have been removed, is positioned in the first working station Ba with the mounting rods 20, 23, 26, 30 kept horizontally, the engine removing and installing device 34 and the trunk lid removing and installing device 35 move the gripper means 39, 45 that hold the engine hood 2a and the trunk lid 2d and the bolt removing and installing means 40, 46 that hold the bolts a, d to positions above the engine hood mounting means 11 and the trunk lid mounting means 14, respectively. The gripper means 39, 45 and the bolt removing and installing means 40, 46 are then operated in a reversed fashion to mount the engine hood 2a and the trunk lid 2d on the mounting means 11, 14, respectively, while keeping them in the horizontal posture. After the engine hood 2a and the trunk lid 2d gripped by the gripper means 39, 45 are positioned on the respective mounting means 11, 14, they are fastened to the mounting means 11, 14 by the bolts a, d which are held by the bolt removing and installing means 40, 46.

As shown in FIGS. 7 and 8, each of the door openers 36 has an L-shaped arm 50 rotatably disposed on the upper end of a main shaft 49 which is vertically disposed on one side of the feed path 5. An engaging pin 51, which can disengageably engage the closed door 2c installed on the automotive body 1 that is positioned in the second working station Bb, is mounted on the distal end of the arm 50. At the time the automotive body 1 is positioned in the second working station Bb, the door openers 36 are positioned alongside of the respective closed doors 2c on the automotive body 1, with the engaging pins 51 facing toward the respective doors 2c. The L-shaped arms 50 are then turned to bring the engaging pins 51 into engagement with the respective doors 2c, and then turned back to cause the engaging pins 51 to open the doors 2c.

As shown in FIGS. 7 and 8, each of the door removing and installing devices 37 comprises a gripper means 52 for removably gripping one of the doors 2c, and a hinge pin removing and installing means 53 for removing and installing hinge pins e by which the door 2c is installed on the automotive body 1, the means 52, 53 being positioned alongside of the closed door 2c on the automotive body 1 which has been positioned in the third working station Bc. The gripper means 52 is movable on a rail 54 along the inner panel surface of the door 2c which is opened, the rail 54 being disposed alongside of the feed path 5 and inclined toward the feed path 5. The hinge pin removing and installing means 53 is supported on an end of an arm frame 58 which is movable on and along rails 57 extending parallel to the rail 54 and laid on an upper surface of a base table 56. The base table 56 is positioned above the rail 54 and mounted on a main frame 55 above the feed path 5. The arm frame 58 extends laterally from the base table 56. The hinge pin removing and installing means 53 is vertically movable by a lifting/lowering means 59. When the feed jig 4 is positioned in the third working station Bc, the gripper means 52 and the bolt removing and installing means 53 are positioned laterally of the door mounting means 13L, 13R of the feed jig 4.

At the time the automotive body 1 with the doors 2c being open is positioned in the third working station Bc, the gripper means 52 and the hinge pin removing and installing means 53 move on the rails 54 and the rails 57 along the inner panel surfaces of the doors 2c toward the hinges (not shown) of the automotive body 1. After they have thus moved, the gripper means 59 are actuated to grip the respective doors 2c, and the hinge pin removing and installing means 53 are lowered toward the hinges of the automotive body 1 by the lifting/lowering means 59. The hinge pin removing and installing means 53 are then actuated to remove the hinge pins e from the automotive body 1, and thereafter lifted to move the hinge pins e away from the automotive body 1. Subsequently, the gripper means 52 and the hinge pin removing and installing means 53 are retracted on the rails 54, 57 to displace the doors 2c away from the automotive body 1. In this manner, the doors 2c together with the hinge pins e are detached from the automotive body 1. At this time, the gripper means 52 hold the respective doors 2c in substantially the same vertical posture as they are installed on the automotive body 1.

After the doors 2c have been removed from the automotive body 1, the automotive body 1 is fed along the feed path 5, and followed by the feed jig 4 which is then positioned in the third working station Bc with the mounting rods 20, 23, 26, 30 oriented in the vertical condition. Then, the gripper means 52 with the doors 2c held thereby and the hinge pin removing and installing means 53 with the hinge pins e held thereby are operated in a reversed fashion to mount the doors 2c, which are kept in the opened, vertical posture, on the respective door mounting means 13L, 13R. While the doors 2c gripped by the respective gripper means 52 are being positioned in the opened, vertical posture on the door mounting means 13L, 13R, the doors 2c are mounted respectively on the door mounting means 13L, 13R by the hinge pins e which are held by the hinge pin removing and installing means 53. The door removing and installing means 37 also include door closers 60, respectively, disposed alongside of the feed path 5 in the third working station Bc as shown in FIG. 7. The doors 2c mounted in the opened, vertical posture on the respective door mounting means 13L, 13R are then closed by the respective door closers 60.

As shown in FIGS. 7 and 8, each of the fender removing and installing device 38 has a gripper means 61 for removably gripping one of the fenders 2b, and a bolt removing and installing means 62 for removing and installing bolts g by which the fender 2a is installed on the automotive body 1, the means 61, 62 being positioned laterally of the fender 2b of the automotive body 1 which has been positioned in the third working station Bc. The gripper means 61 is movable on a rail 63 disposed laterally of the feed path 5, toward the fender 2b. The bolt removing and installing means 62 is mounted on the main frame 55 above the fender 2b of the automotive body 1 which has been positioned in the third working station Bc. The bolt removing and installing means 62 is vertically movable toward and away from the fender 2b by a lifting/lowering means 64. When the feed jig 4 is positioned in the third working station Bc, the gripper means 61 are positioned laterally of the respective fender mounting means 12L, 12R, and the bolt removing and installing means 62 are positioned respectively above the fender mounting means 12L, 12R.

When the automotive body 1 with the fenders 2b installed thereon is positioned in the third working station Bc, the gripper means 61 are moved on the rails 63 laterally toward the respective fenders 2b, and the bolt removing and installing means 62 are lowered toward the fenders 2b by the lifting/lowering means 64. After the fenders 2b have been gripped by the respective gripper means 61, the bolts g are detached from the automotive body 1 and held by the bolt removing and installing means 62. Thereafter, the gripper means 61 are retracted on the rails 63, and the bolt removing and installing means 62 are elevated to displace the fenders 2b and the bolts g away from the automotive body 1. The fenders 2b together with the bolts g are removed from the automotive body 1 in this fashion. At this time, the gripper means 61 hold the respective fenders 2b in substantially the same vertical posture as they are installed on the automotive body 1, and turn the fenders 2b by 90° in their vertical plane.

After the fenders 2b have been removed from the automotive body 1, the automotive body 1 is fed along the feed path 5, and followed by the feed jig 4 which is then positioned in the third working station Bc with the mounting rods 20, 23, 26, 30 oriented vertically. Then, the gripper means 61 with the fenders 2b held thereby and the bolt removing and installing means 62 with the bolts g held thereby are operated in a reversed fashion to mount the fenders 2b, which are kept in the vertical posture, on the respective fender mounting means 12L, 12R. While the fenders 2b gripped by the respective gripper means 61 are being positioned in the vertical posture on the fender mounting means 12L, 12R, the fenders 2b are mounted respectively on the fender mounting means 12L, 12R by the bolts g which are held by the bolt removing and installing means 62.

In each of the second and fourth working stations Bb, Bd, there are disposed robots 65, one on each side of the feed path 5, for gripping the motion imparting members 19L, 19R and applying drive forces thereto in order to rotate the shafts 10L, 10R about their own axes.

Operation of the overall body panel removing removing and installing apparatus 3 will be described below with reference to FIG. 9.

After a feed jig 4 has been introduced from the jig feed path 9 into the feed path 5, an automotive body 1 with body panels 2 installed thereon is successively positioned and operated on in the first through fourth working stations Ba through Bd. More specifically, in the first working station Ba, the engine hood 2a and the trunk lid 2d are removed in their horizontal posture from the automotive body 1 by the engine hood removing and installing device 34 and the trunk lid removing and installing device 35, and are held, together with the bolts a, b, by these devices 34, 35. Then, the doors 2c are opened by the door openers 36 in the second working station Bb. Thereafter, in the third working station Bc, the doors 2c and the fenders 2b are removed, in their vertical posture, from the automotive body 1 by the door removing and installing device 37 and the fender removing and installing device 38, and are held, together with the hinge pins e and the bolts g, by these devices 37, 38. After the automotive body 1 has passed through the fourth working station Bd, it is introduced from the feed path 5 into the automotive body feed path 7, and fed therealong.

The feed jig 4 which has been introduced into the feed path 5 upstream of the automotive body 1 is also successively positioned and operated on in the first through fourth working stations Ba through Bd. More specifically, when the feed jig 4 is positioned in the first working station Ba, all the mounting rods 20, 23, 26, 30 of the feed jig 4 are oriented horizontally, and the engine hood 2a and the trunk lid 2d are mounted, in their horizontal posture, on the engine hood mounting means 11 and the trunk lid mounting means 14, respectively, with the bolts a, d by the engine hood removing and installing device 34 and the trunk lid removing and installing device 35, respectively. Then, the motion imparting members 19L, 19R of the feed jig 4 are gripped by the robots 65 in the second working station Bb. The shafts 10L, 10R are turned so that the engine hood 2a and the trunk lid 2d are directed vertically until their outer panel surfaces face outwardly. All the mounting rods 20, 23, 26, 30 are now directed vertically.

In the third working station Bc, the doors 2c and the fenders 2b are mounted, in their vertical posture, on the door mounting means 13L, 13R and the fender mounting means 12L, 12R of the feed jig 4 with the hinge pins e and the bolts g by the door removing and installing device 37 and the fender removing and installing device 38, respectively. At this time, the body panels 2 mounted on the feed jig 4 are vertically oriented and parallel to each other. Subsequently, in the fourth working station Bd, the motion imparting members 19L, 19R of the feed jig 4 are gripped by the robots 65 and the shafts 10L, 19R are turned 180° to direct the body panels 2 vertically with their inner panel surfaces facing outwardly. The feed jig 4 is then introduced from the feed path 5 into the body panel feed path 8, and fed therealong.

In the removal zone B, as described above, the automotive body 1 with the body panels 2 installed thereon and the feed jig 4 are alternately fed along the feed path 5, and are successively positioned and operated on in the working stations Ba through Bd. In the first and third working stations Ba, Bc, the body panels 2 are removed from the automotive body 1 and held by the body panel removing and installing apparatus 3, and then mounted on the feed jig 4 which is positioned in these working stations Ba, Bc. Thereafter, the feed jig 4 is fed along the feed path 5. Therefore, successive steps of removing the body panels 2 from the automotive body 1 and feeding the body panels 2 and the automotive body 1 to a subsequent processing zone are successively and efficiently carried out on the feed path 5.

In the first and third working stations Ba, Bc, the body panel removing and installing apparatus 3 transfers the body panels 2 from the automotive body 1 to the feed jig 4, which are alternately fed on the same feed path 5. The feed jig 4 is constructed such that the body panels 2 are mounted thereon in substantially the same posture and relative positional relationship as they are installed on the automotive body 1. Therefore, the body panel removing and installing apparatus 3 is required to operate in a small range, can transfer the body panels 2 through simple operations, and is relatively simple in structure and small in size.

In the removal zone B, the doors 2c on the automotive body 1 are opened by the door openers 36 in the second working station Bb, and thereafter the doors 2c are removed from the automotive body 1 by the door removing and installing devices 37 in the third working station Bc. Consequently, the doors 2c can quickly be removed from the automotive body 1 through relatively simple operations of the door removing and installing devices 37.

The engine removing and installing device 34 and the trunk lid removing and installing device 35 are positioned upstream of the door removing and installing devices 37 and the fender removing and installing devices 38. However, the devices 34, 35 may be positioned downstream of the devices 37, 38. The removing and installing devices 34, 35, 37, 38 may be disposed in respective other stations.

A process of coating the automotive body 1 in the coating zone C therefor will be described in detail with reference to FIG. 10.

Figure 10:
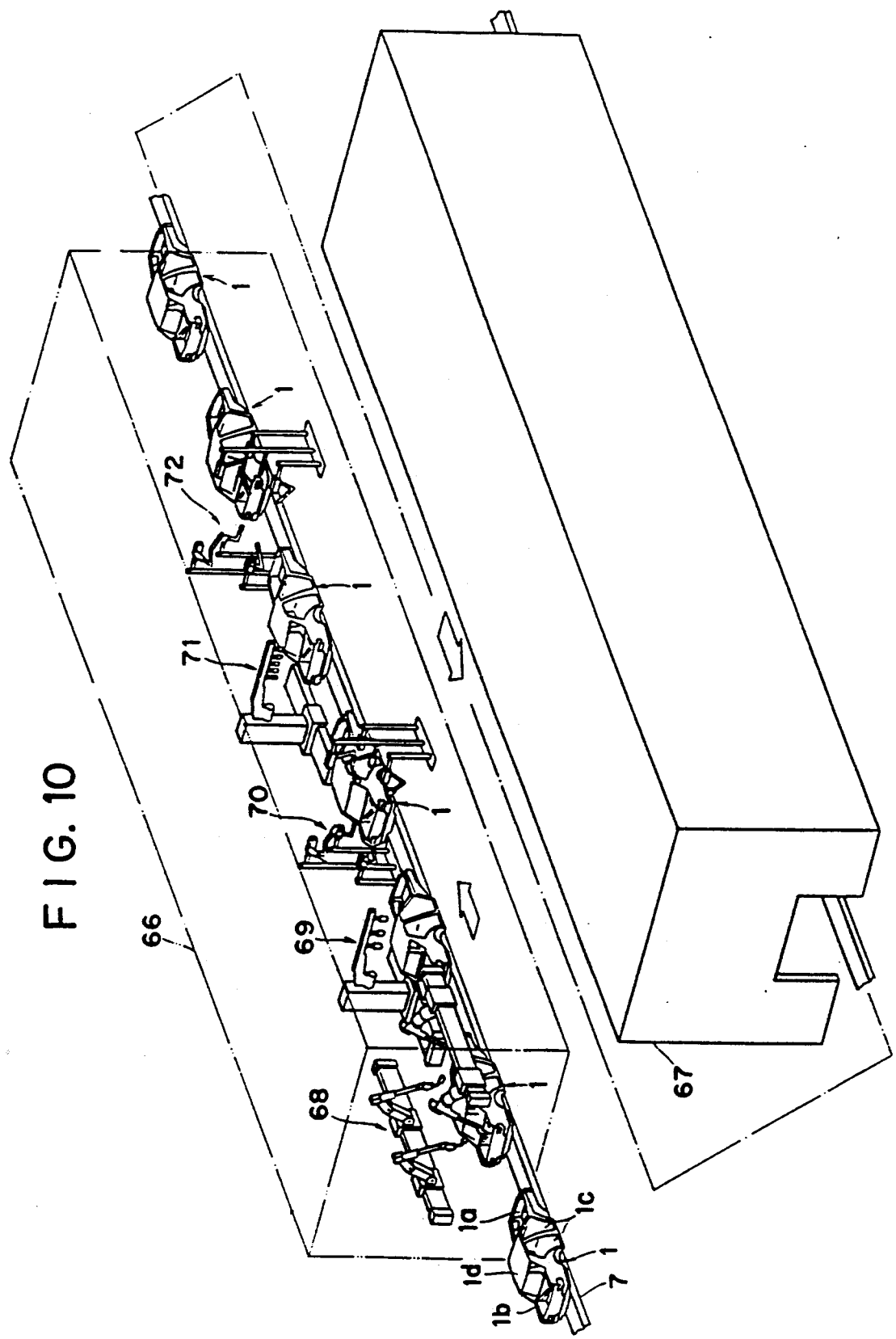

As shown in FIG. 10, the coating zone C for the automotive body 1 includes a base coating booth 66 and a clear coating booth 67 which are disposed on the automotive body feed path 7. In the coating zone C, a base coating and a clear coating are successively applied to the automotive body 1 within the base coating booth 66 and the clear coating booth 67, respectively, while the automotive body 1 is being fed along the automotive body feed path 7.

The base coating booth 66 accommodates therein a coating robot 68, a reciprocator 69, a coating robot 70, a reciprocator 71, and a coating robot 72, which are successively arranged downstream along the automotive body feed path 7. The automotive body 1 as it is fed down the automotive body feed path 7 is coated on its various surfaces with base coating layers by the coating robots 68, 70, 72 and the reciprocators 69, 71 in the base coating booth 66.

More specifically, the peripheral edges of an engine compartment 1a, a trunk room 1b, and door openings 1c of the automotive body 1 are coated by the coating robot 68. Then, an upper surface of the automotive body 1, i.e., a roof 1d, is coated by the reciprocator 69 above the automotive body 1, after which side surfaces of the automotive body 1 are coated by the coating robot 70. Thereafter, the upper and side surfaces of the automotive body 1 are successively coated again by the reciprocator 71 and the coating robot 72. As a result, the automotive body 1 is coated with double base coating layers.

The automotive body 1 with the base coating applied thereto is then fed into the clear coating booth 67, in which the automotive body 1 is coated with double clear coating layers in the same manner as the coating process in the base coating booth 66.

The coating layers which have been applied to the automotive body 1 in the booths 66, 67 are baked and dried in a drying furnace (not shown). Then, the automotive body 1 is trimmed or furnished with fittings in the trimming zone D for the automotive body 1 shown in FIG. 1.

A process of coating the body panels 2 in the coating zone C therefor will be described in detail with reference to FIG. 11.

Figure 11:
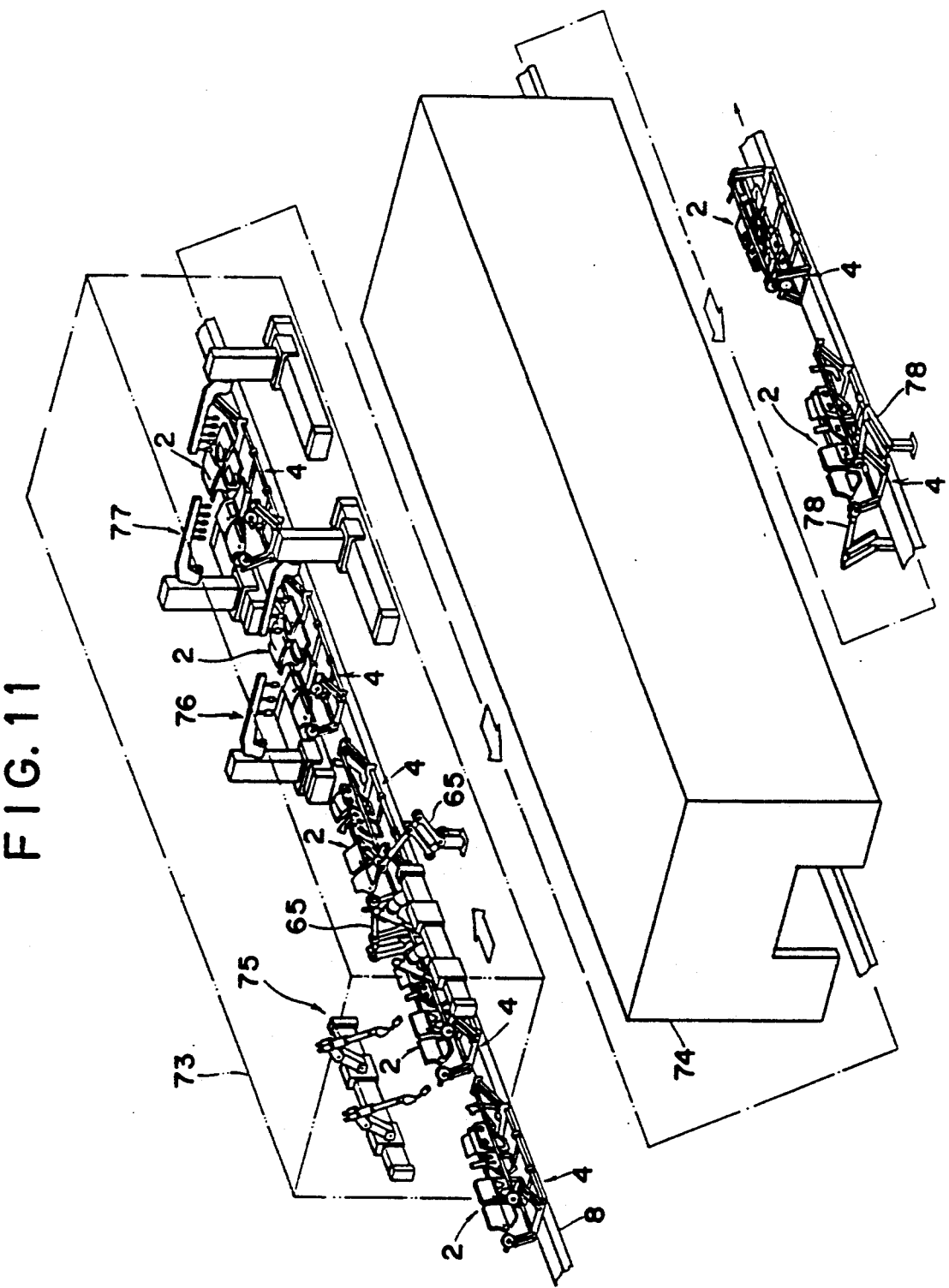

As shown in FIG. 11, the coating zone C for the body panels 2 includes a base coating booth 73 and a clear coating booth 74 which are disposed on the body panel feed path 8. The base coating booth 73 accommodates therein a coating robot 75, a robot 65, which is of the same structure as that of the robot 65 for rotating the shafts 10L, 10R of the feed jig 4, and reciprocators 76, 77, which are successively arranged downstream along the body panel feed path 8.

The body panels 2, which have been installed on the feed jig 4 in the removal zone B, are fed on the body panel feed path 8 into the base coating booth 73, the body panels 2 being directed vertically with the inner panel surfaces facing outwardly. First, the inner panel surfaces of the body panels 2 are coated laterally by the coating robot 75. Then, the shafts 10L, 10R of the feed jig 4 are turned 90° by the robot 65 until the body panels 2 lie horizontally with their outer panel surfaces facing upwardly. The outer panel surfaces of the horizontal body panels 2 are repeatedly coated by the reciprocators 76, 77 positioned thereabove, so that double base coating layers are applied to the body panels 2.

The body panels 2 with the base coating applied thereto are then fed with the feed jig 4 into the clear coating booth 74, in which the body panels 2 are coated with double clear coating layers in the same manner as the coating process in the base coating booth 73.

After the body panels 2 have been coated as described above, the shafts 10L, 10R of the feed jig 4 are turned 180° by robots 78 which are disposed downstream of the clear coating booth 74, one on each side of the body panel feed path 8, and at the same time, the arms 16L, 16R of the feed jig 4 are swung. The body panels 2 are now horizontally oriented with their inner panel surfaces facing upwardly, and the body panels 2 along the shaft 10L and the body panels 2 along the shaft 10R are vertically superposed but spaced from each other. The body panels 2 are then continuously fed, together with the feed jig 4, down the body panel feed path 8. The coating layers which have been applied to the body panels 2 are baked and dried in a drying furnace (not shown). Then, the body panels 2 are trimmed or furnished with fittings in the trimming zone D for the body panels 2 shown in FIG. 1.

In the coating zone C for the body panels 2, the body panels 2 are installed parallel to each other on the feed jig 4, and can be turned about and with the shafts 10L, 10R. Therefore, when the body panels 2 are simultaneously turned about and with the shafts 10L, 10R while they are being fed with the feed jig 4 along the body panel feed path 8, the inner and outer panel surfaces of the body panels 2 can successively and efficiently be coated in their posture which is suitable for coating. When the outer panel surfaces of the body panels 2 are to be coated, the body panels 2 are simultaneously oriented horizontally to cause the outer panel surfaces to face upwardly. Then, the upwardly facing outer panel surfaces are coated by the reciprocators 76, 77. Therefore, the arrangement for coating the outer panel surfaces is simple in construction. The outer panel surfaces are uniformly coated since the coated layers have not runs and sags.

After the outer panel surfaces of the body panels 2 have been coated in the coating zone C, the body panels 2 are turned about and with the shafts 10L, 10R until the outer panel surfaces face downwardly, and the arms 16L, 16R are swung so that the body panels 2 along the shaft 10L and the body panels 2 along the shaft 10R are vertically superposed but spaced from each other. The body panels 2 are then introduced, together with the feed jig 4, into the drying furnace in which the coating layers are baked and dried. Therefore, no dust particles and other foreign matter are applied to the outer panel surfaces of the body panels 2 while the coating layers are being baked and dried, with the result that the coated outer panel surfaces are even and smooth. As the feed jig 4 may be relatively small in size, the drying furnace may be also small in size.

Figure 12:
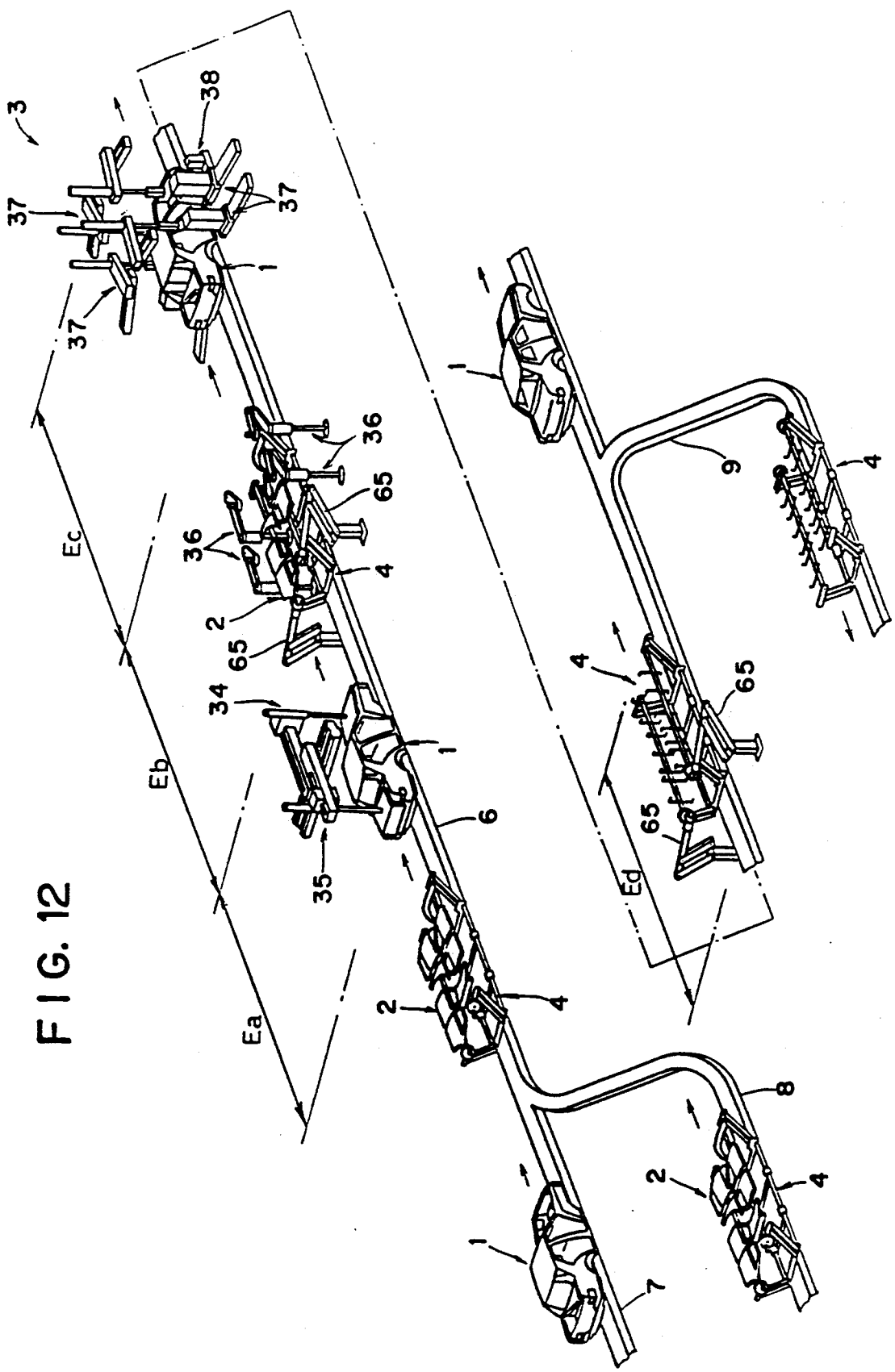

The structure and operation of the body panel removing and installing apparatus 3 in the installation zone E will be described below with reference to FIG. 12.

The body panel removing and installing apparatus 3 in the installation zone E is identical in structure to the body panel removing and installing apparatus 3 in the removal zone B. The body panel removing and installing apparatus 3 in the installation zone E has first through fourth working stations Ea through Ed which are successively arranged downstream along the feed path 6.

In the installation zone E, the feed jig 4 with the body panels 2 installed thereon and the automotive body 1 are successively introduced from the body panel feed path 8 and the automotive body feed path 7 into the feed path 6, and alternately fed on the feed path 6, with the automotive body 1 upstream of the feed jig 4. While being fed along the feed path 6, the feed jig 4 and the automotive body 1 are successively positioned in the working stations Ea through Ed.

Before the feed jig 4 enters the feed path 6, the shafts 10L, 10R have been turned so that the body panels 2 lie horizontally with the outer panel surfaces thereof facing upwardly.

A feed jig 4 with body panels 2 mounted thereon is introduced into the feed path 6, and successively positioned in the working stations Ea through Ed. More specifically, in the first working station Ea, the engine hood 2a and the trunk lid 2d are removed by the engine hood removing and installing device 34 and the trunk lid removing and installing device 35, and are held, together with the bolts a, b, by these devices 34, 35. Then, the shafts 10L, 10R are turned by the robot 65 to direct the doors 2c and the fenders 2b vertically with the outer panel surfaces facing outwardly, and thereafter the doors 2c are opened by the door openers 36 in the second working station Eb.

Thereafter, in the third working station Ec, the doors 2c and the fenders 2b are removed by the door removing and installing device 37 and the fender removing and installing device 38, and are held, together with the hinge pins e and the bolts g, by these devices 37, 38. Subsequently, the shafts 10L, 10R are turned by the robot 65 to orient the mounting rods 20, 23, 26, 30 horizontally, after which the feed jig 4 is transferred from the feed path 6 to the jig feed path 9 for return to the feed path 5.

The automotive body 1, which is positioned upstream of the feed jig 4, is successively positioned in the working stations Ea through Ed. In the first working station Ea, the engine hood 2a and the trunk lid 2d which are held by the engine hood removing and installing device 34 and the trunk lid removing and installing device 35, respectively, are installed on the automotive body 1 with the bolts a, d. The automotive body 1 passes through the second working station Eb. In the third working station Ec, the doors 2c and the fenders 2b which are held by door removing and installing device 37 and the fender removing and installing device 38, respectively, are installed on the automotive body 1 with the hinge pins e and the bolts g. Then, the automotive body 1 goes through the fourth working station Ed, and is continuously fed down the feed path 6 toward a subsequent processing zone.

In the installation zone E, as described above, the body panels 2 are removed from the feed jig 4 and installed on the automotive body 1 according to a process which is a reversal of the process in the removal zone B. The installation process can continuously and efficiently be effected on the same feed path 6. The body panel removing and installing apparatus 3 is required to operate in a small range, can transfer the body panels 2 from the feed jig 4 to the automotive body 1 through simple operations, and is relatively simple in structure and small in size.

In the above automobile coating line, the body panels 2 are removed from and installed on the automotive body 1 by the respective body panel removing and installing apparatus 3 of relatively small size on the respective feed paths 5, 6. The structures of the removal and installation zones B, E are therefore relatively small in size. Since the fasteners such as the bolts a, which are detached from the automotive body 1 with the body panels 2 in the removal zone B, are installed, together with the body panels 2, on the feed jig 4, and fed thereby to the installation zone E. Accordingly, no special feed path is required for feeding these fasteners from the removal zone B to the installation zone E. As a consequence, the coating line is also relatively small in size.

The automotive body 1 from which the body panels 2 are removed on the feed path 5, and these removed body panels 2 are introduced from the feed path 5 into the automotive body feed path 7 and the body panel feed path 8, respectively, and fed respectively along these feed paths 7, 8 during which time the automotive body 1 and the body panels 2 are coated and trimmed. Thereafter, the automotive body 1 and the body panels 2 are introduced from the automotive body feed path 7 and the body panel feed path 8 into the feed path 6 on which the body panels 2 are removed from the feed jig 4 and installed again on the automotive body 1. Thus, the process of removing the body panels 2 from the automotive body 1, the process of coating and trimming the automotive body 1 and the body panels 2, and the process of installing the body panels 2 on the automotive body 1 are successively carried out.

Furthermore, the feed jig 4, which has been fed from the removal zone B through the feed paths 5, 8, 6 to the installation zone E, is returned from the installation zone E to the removal zone B through the jig feed path 9 after the body panels 2 are detached from the feed jig 4. Therefore, the feed jig 4 is repeatedly and efficiently used to feed the body panels 2, which are removed from the automotive body 1, from the removal zone B through the coating zone C and the trimming zone C to the installation zone E.

The mounting means 11, 12L, 12R, 13L, 13R, 14 of the feed jig 4 and the body panels 2 mounted thereon can be turned about and with the shafts 10L, 10R when the drive forces are applied to the motion imparting members 19L, 19R by the robots 65. Therefore, no motors are required on the feed jig 4 for rotating the shafts 10L, 10R, and the feed jig 4 is consequently simple in construction. As no motors or actuators are disposed on the feed jig 4, it is not necessary to make the feed jig 4 explosion-proof in preparation for the coating process and also to make the feed jig 4 heat-resistant in preparation for the drying process in the coating zone C. Therefore, the feed jig 4 is relatively inexpensive to manufacture. As the feed jig 4 is simple, its functions are not adversely affected by coating deposits applied thereto in the coating zone C, and hence the feed jig 4 is durable in operation.

Figure 13:
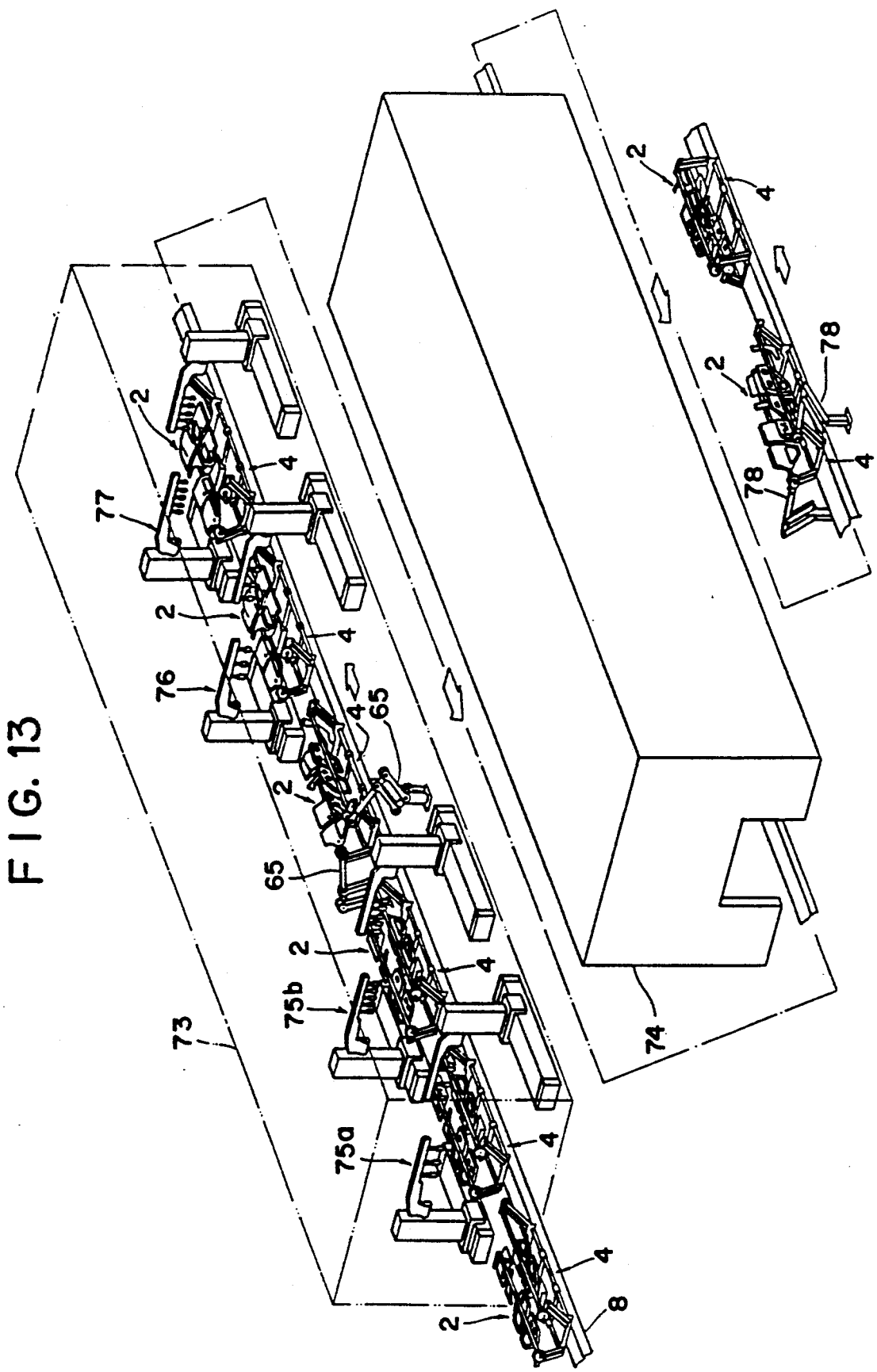
FIG. 13 is a perspective view illustrative of another method of coating body panels.

Another process of coating body panels 2 in the coating zone C of the coating line will be described with reference to FIG. 13. FIG. 13 shows in perspective the section of the coating line in the coating zone C for the body panels 2.

In the coating zone C shown in FIG. 13, the base coating booth 73 accommodates therein reciprocators 75a, 75b, in place of the coating robot 75 shown in FIG. 11, for coating the inner panel surfaces of the body panels 2, the reciprocators 75a, 75b being successively arranged downstream along the body panel feed path 8. The other structural details of the coating zone C are the same as those of the coating zone C shown in FIG. 11. The body panels 2 installed on the feed jig 4 in the removal zone B lie horizontally with their inner panel surfaces facing upwardly before they enter the base coating booth 73. The body panels 2, together with the feed jig 4, are then introduced into the base coating booth 73.

In the base coating booth 73, the upwardly facing inner panel surfaces of the horizontal body panels 2 are first successively coated by the reciprocators 75a, 75b disposed thereabove. Then, the body panels 2 are turned 180° around and with the shafts 10L, 10R by the robot 65, so that the outer panel surfaces of the body panels 2 are oriented upwardly. Thereafter, the outer panel surfaces are successively coated by the reciprocators 76, 77 disposed thereabove, so that they are coated with double base coating layers.

The body panels 2 with the base coating applied thereto are then fed with the feed jig 4 into the clear coating booth 74, in which the body panels 2 are coated with double clear coating layers in the same manner as the coating process in the base coating booth 73. Thereafter, the coating layers are baked and dried.

In the coating zone C for the body panels 2, the inner and outer panel surfaces of the body panels 2 are successively and efficiently coated as with the previous coating line. Since the inner and outer panel surfaces are coated while the body panels 2 are being held in the horizontal posture, the arrangement for coating these surfaces is structurally simple.

A method of assembling body panels and an automotive body together, an apparatus for removing body panels from and installing body panels on an automotive body in the assembling method, and also a feed jig for holding and feeding body panels in the assembling method, according to a second embodiment of the present invention, will be described below with reference to FIGS. 14 through 24.

Figure 14:
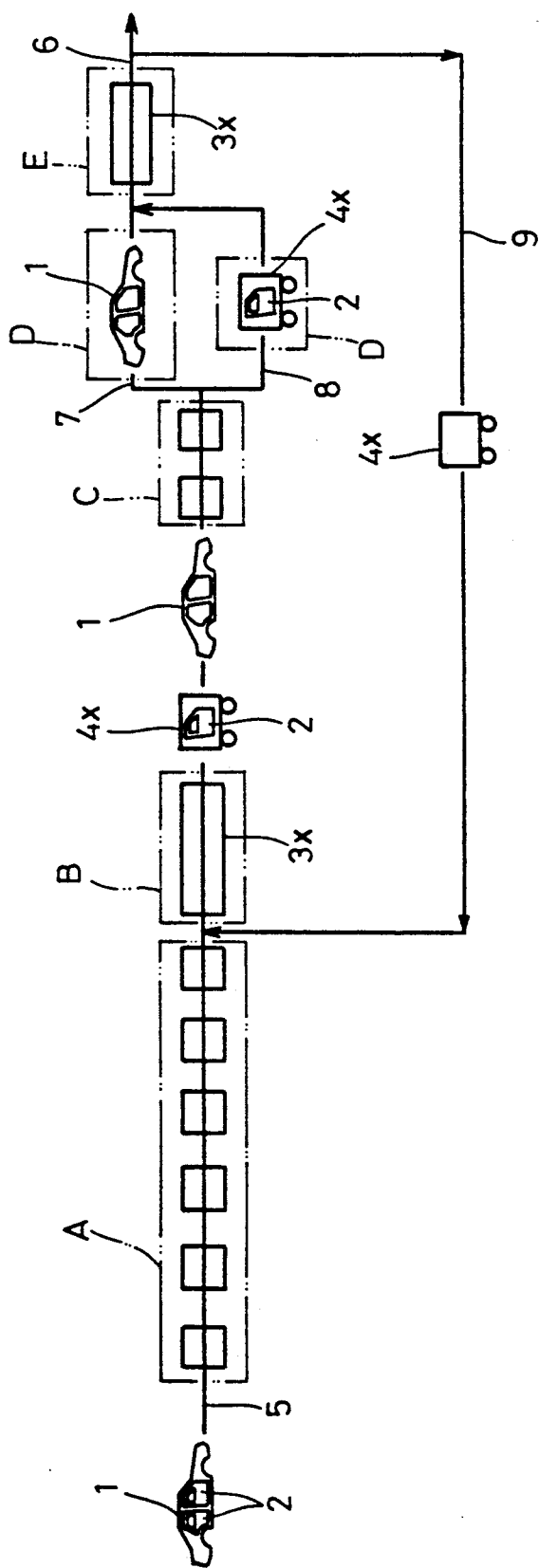
FIG. 14 is a schematic view showing an automobile coating line which employs a method of assembling body panels and an automotive body together, an apparatus for removing body panels from and installing body panels on an automotive body in the assembling method, and also a feed jig for holding and feeding body panels in the assembling method, according to a second embodiment of the present invention.

As shown in FIG. 14, an automobile coating line has feed paths 5 through 9, which are the same as those of the first embodiment, and also includes a pretreatment zone A, a removal zone B, a coating zone C, a pair of trimming zones D, and an installation zone E, which also effect the same processes as those described previously. In each of the removal and installation zones B, E, a feed jig 4x which is different from the feed jig 4 of the first embodiment and a body panel removing and installing apparatus 3x which is different from the body panel removing and installing apparatus 3 of the first embodiment are employed to transfer body panels 2 between an automotive body 1 and the feed jig 4x. In the coating zone C, the automotive body 1 and the body panels 2 installed on the feed jig 4x are coated and baked and dried while they are being alternately fed along the feed path 5.

More specifically, the pretreatment zone Z, the removal zone B, and the coating zone C are successively arranged downstream along the feed path 5. Only the trimming zones D are disposed respectively on the automotive body feed path 7 and the body panel feed path 8, respectively. The installation zone E is disposed on the feed path 6.

The automotive body 1 and the body panels 2 are separately fed along the automotive body feed path 7 and the body panel feed path 8, respectively, only n the trimming zone D, and trimmed or furnished with fittings therein. In the other zones A, B, C, E, the automotive body 1 and the body panels 2 are fed on the same feed path 5 or 6 while they are being treated or operated on. The feed jig 4x is introduced from the jig feed path 9 into the feed path 5 at a position between the pretreatment zone A and the removal zone B. After having left the installation zone E the feed jig 4x is sent from the feed path 6 to the jig feed path 9.

In the second embodiment, the body panels 2 include an engine hood 2a, a trunk lid 2d, and front and rear doors 2c on left and right sides, but not left and right front fenders.

The feed jig 4x will be described in detail below with reference to FIGS. 15 through 19.

As shown in FIGS. 15 through 18, the feed jig 4x has a pair of first longitudinal shafts 79L, 79R angularly movable about their own axes and disposed in upper opposite sides thereof, a second shaft 80 angularly movable about its own axis and extending forwardly from a central position intermediate between the front ends of the first shafts 79L, 79R, the second shaft 80 being operatively coupled for rotation with the first shaft 79L, a third shaft 81 angularly movable about its own axis and extending rearwardly from a central position intermediate between the rear ends of the first shafts 79L, 79R, the third shaft 81 being operatively coupled for rotation with the first shaft 79R, two pairs of door mounting means 82L, 82R mounted one pair on each of front and rear portions of the first shafts 79L, 79R, an engine hood mounting means 83 mounted on the second shaft 80, and a trunk lid mounting means 84 mounted on the third shaft 81. These mounting means 82L, 82R, 83, 84 are positioned such that they substantially correspond in position to the body panels 2 which are installed on the automotive body 1.

Figure 15:
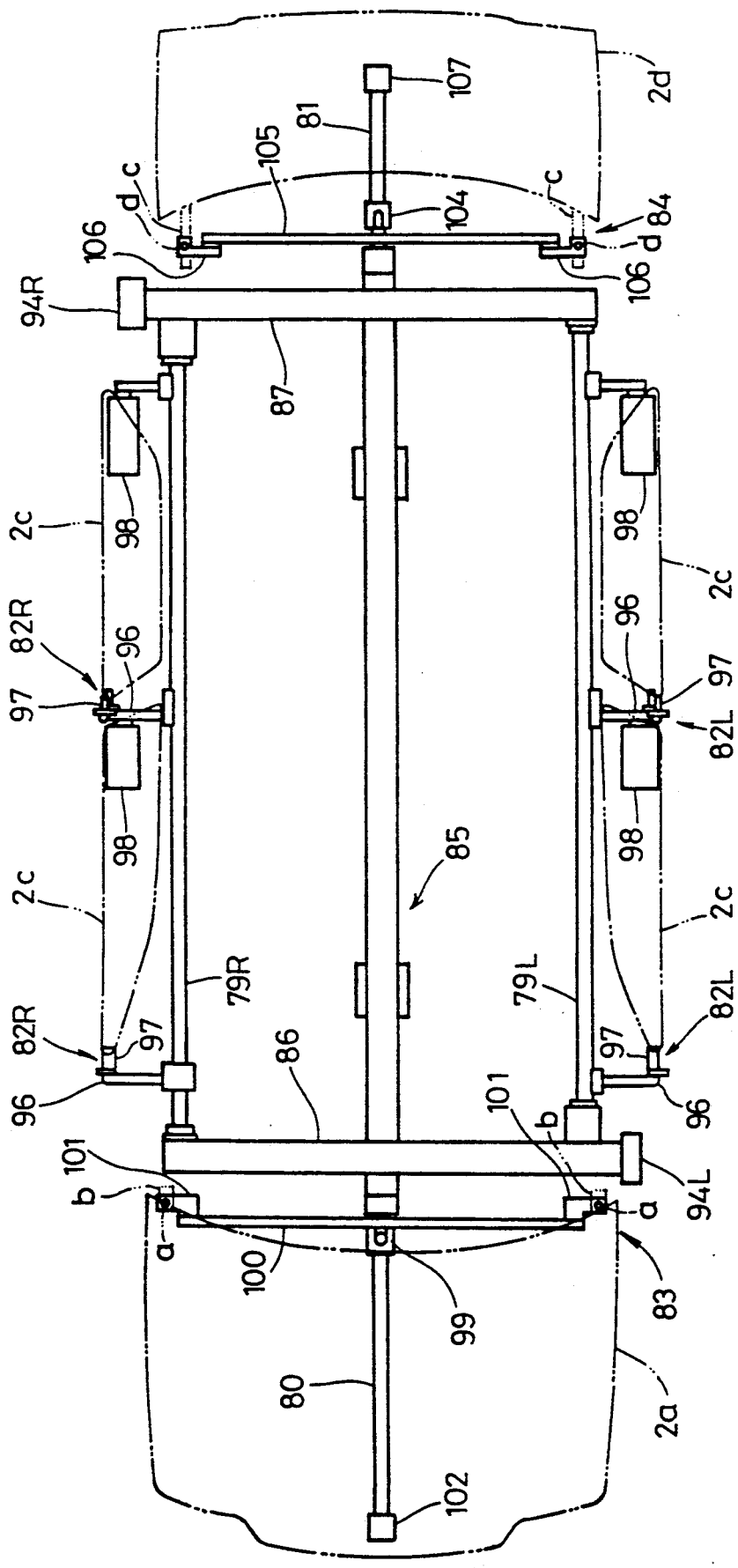
FIGS. 15, 16, and 17 are plan, side elevational, and rear elevational views, respectively, of the feed jig.

The first shafts 79L, 79R have opposite ends which are angularly movably inserted in frame pipes 86, 87, respectively, which are transversely mounted on an upper surface of a frame 85 of the feed jig 4x at front and rear positions on the frame 85, as shown in FIG. 15. The second shaft 80 has a rear portion angularly movable inserted into the central region of the frame pipe 86, and coupled to the first shaft 79L through a power transmitting mechanism 88L (FIG. 18) in the frame pipe 84.

Figure 18:
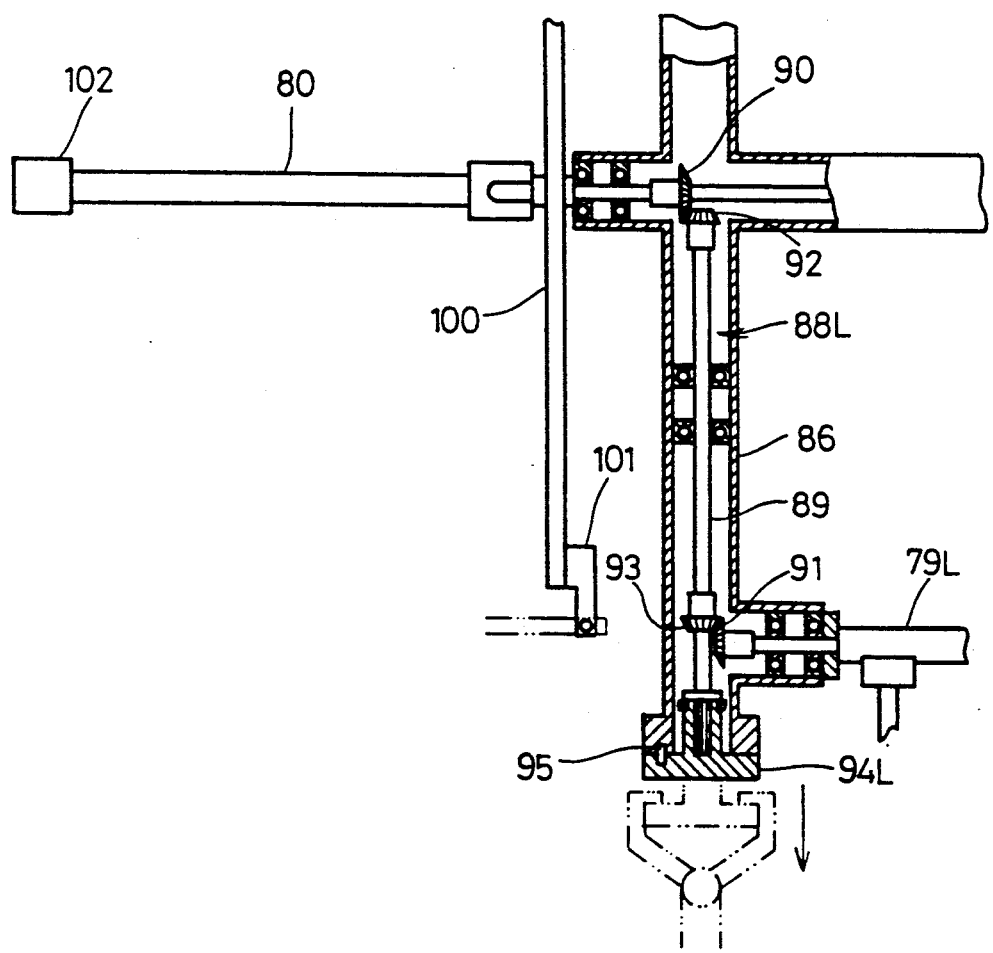
FIG. 18 is a cross-sectional view of a portion of the feed jig

As illustrated in FIG. 18, the power transmitting mechanism 88L comprises a rotation transmitting shaft 89 extending from a position near the second shaft 80 toward an open end of the frame pipe 86 near the first shaft 79L and rotatably supported in the frame pipe 86, a bevel gear 90 mounted on the second shaft 80 in the frame pipe 86, a bevel gear 91 mounted on a distal end of the first shaft 79L, and bevel gears 92, 93 mounted on the rotation transmitting shaft 89 and held in mesh with the bevel gears 90, 91, respectively. A motion imparting member 94L, to which a rotative drive force will be applied to rotate the rotation transmitting shaft 89, is splined to the end of the shaft 89 in the open end of the frame pipe 86, so that the motion imparting member 94L is axially movable with respect to the shaft 89. The motion imparting member 94L is disengageably coupled to the open end of the frame pipe 86 through a pin 95. When the motion imparting member 94L engages the frame pipe 86, the rotation transmitting shaft 89 cannot be angularly moved about its own axis. When the motion imparting member 94L is axially moved away from the shaft 89 until it is disengaged from the frame pipe 86, the shaft 89 can rotate with the motion imparting member 94L.

With the motion imparting member 94L held out of engagement with the frame pipe 86, a rotative drive force applied to the motion imparting member 94L is transmitted successively through the rotation transmitting shaft 89 and the bevel gears 93, 91 to the first shaft 79L, and also through the rotation transmitting shaft 89 and the bevel gears 92, 90 to the second shaft 80. Therefore, the first and second shafts 79L, 80 are angularly moved simultaneously about their own axes.

As with the second shaft 80, the third shaft 81 has an end rotatably inserted in the central region of the frame pipe 87, and is operatively coupled to the first shaft 79R through a power transmitting mechanism (not shown), which is of the same construction as that of the power transmitting mechanism 88L, in the frame pipe 87. A motion imparting member 94R is disengageably coupled to an end of the frame pipe 87 remotely from the power imparting member 94L. With the motion imparting member 94R held out of engagement with the frame pipe 87, a rotative drive force is applied to the motion imparting member 94R to rotate the first and third shafts 79R, 81 simultaneously with each other.

Figure 16:
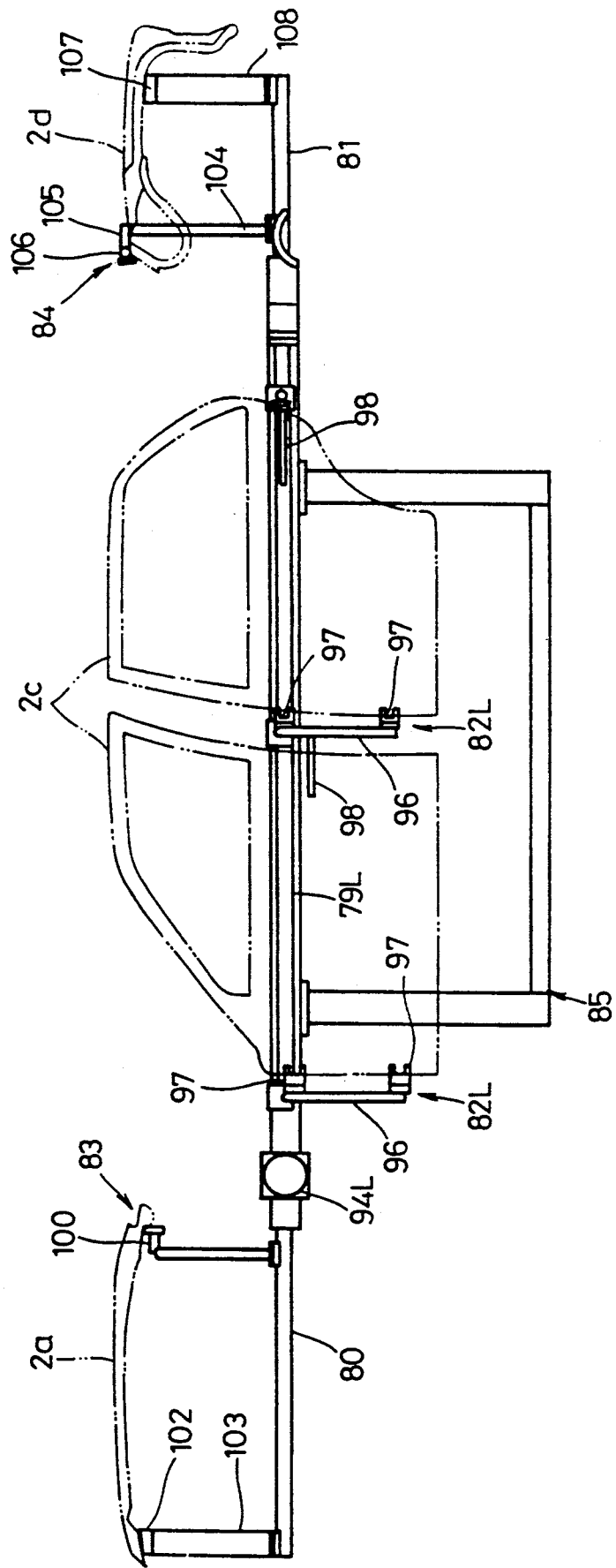
Figure 17:
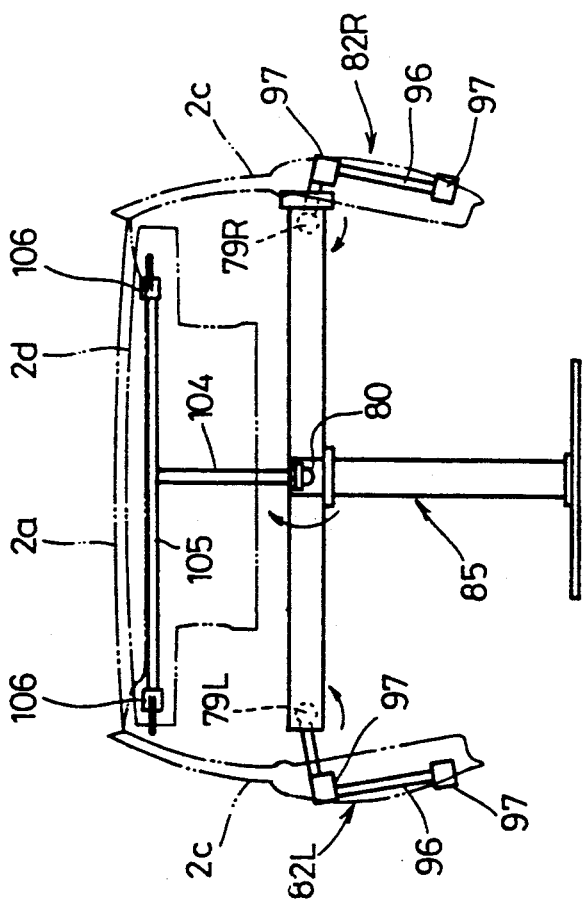

As shown in FIGS. 16 and 17, the door mounting means 82L, 82R have respective mounting rods 96 extending substantially vertically downwardly from the first shafts 79L, 79R and secured thereto for rotation therewith. As with the door mounting means 13L, 13R of the feed jig 4 of the first embodiment, each of the mounting rods 96 has hinges 97 on respective opposite ends thereof. Holders 98 made of a magnetic material for magnetically attracting the rear ends of the front and rear doors 2c are mounted for rotation with the first shafts 79L, 79R, rearwardly of the respective mounting rods 96.

The doors 2c are installed on the respective door mounting means 82L, 82R when the hinges f of the doors 2c are fastened to the hinges 97 by the hinge pins e and the rear ends of the doors 2c are magnetically attracted to the holders 98. As shown in FIGS. 16 and 17, the installed doors 2c are disposed in their vertical posture parallel to the first shafts 79L, 79R and angularly movable therewith, the doors 2c being openably and closably mounted on the door mounting means 82L, 82R.

As shown in FIGS. 15 and 16, the engine hood mounting means 83 has a mounting rod 100 extending transversely and horizontally and having its center fixed to a support 99 vertically mounted on the second shaft 80. The mounting rod 100 has mounts 101 on respective opposite ends thereof. A holder 102 made of a magnetic material for magnetically attracting the front end of the engine hood 2a is fixedly mounted on a support 103 which is vertically mounted on the second shaft 80 forwardly of the mounting rod 100.

The engine hood 2a is installed on the engine hood mounting means 83 when the hinge brackets b of the engine hood 2a are fastened to the mounts 101 by the bolts a and the front end of the engine hood 2a is magnetically attracted to the holder 102. As shown in FIGS. 15 and 16, the installed engine hood 2a is disposed in its horizontal posture parallel to the second shaft 80 and angularly movable therewith. The supports 99, 103 have such a height that the engine hood 2a installed on the engine hood mounting means 83 lies at substantially the same height as the upper ends of the doors 2c which are installed on the door mounting means 82L, 82R.

The trunk lid mounting means 84 has a mounting rod 105 extending transversely and horizontally and having its center fixed to a support 104 vertically mounted on the third shaft 81. The mounting rod 105 has mounts 106 on respective opposite ends thereof. A holder 107 made of a magnetic material for magnetically attracting the rear end of the trunk lid 2d is fixedly mounted on a support 108 which is vertically mounted on the third shaft 81 rearwardly of the mounting rod 105.

The trunk lid 2d is installed on the trunk lid mounting means 84 when the hinge brackets c of the trunk lid 2d are fastened to the mounts 106 by the bolts d and the rear end of the trunk lid 2d is magnetically attracted to the holder 107. As shown in FIGS. 15 and 16, the installed trunk lid 2d is disposed in its horizontal posture parallel to the third shaft 81 and angularly movable therewith. The supports 104, 108 have such a height that the trunk lid 2d installed on the trunk lid mounting means 84 lies at substantially the same height as the upper ends of the doors 2c which are installed on the door mounting means 82L, 82R.

The mounting rod 100 of the engine hood mounting means 83 and the mounting rod 105 of the trunk lid mounting means 84 lie horizontally, and the mounting rods 96 of the door mounting means 82L, 82R are directed vertically. Therefore, the engine hood 2a, the trunk lid 2d, and the doors 2c can be installed on the respective mounting means 83, 84, 82L, 82R in substantially the same posture as they are installed on the automotive body 1. Since the relative positional relationship of the mounting means 83, 84, 82L, 82R is approximately the same as the positional relationship of the body panels 2 to the automotive body 1, the body panels 2 can be installed on the feed jig 4x with their relative positional relationship being substantially maintained.

Figure 19:
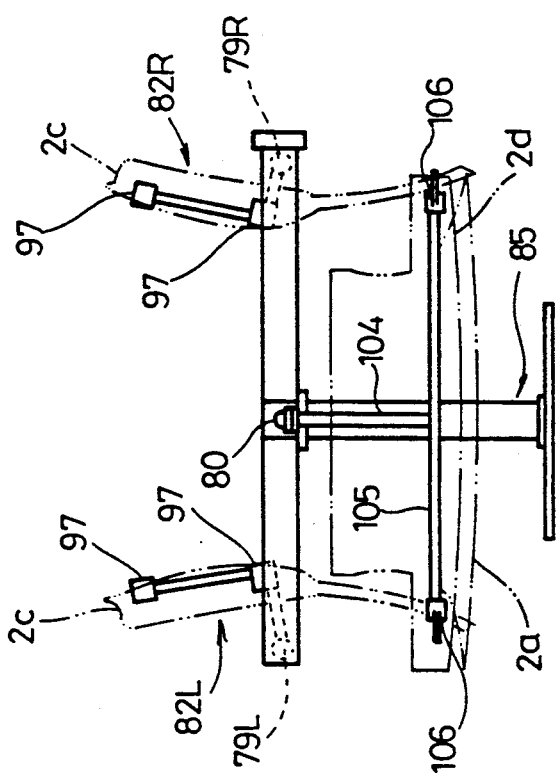
FIG. 19 is a view illustrating the manner in which the feed jig operates.

With the body panels 2 mounted on the feed jig 4x, a rotative drive force is applied to the motion imparting members 94L, 94R to turn the shafts 79L, 79R, 80, 81 by 180° about their own axes. Therefore, the installed body panels 2 can simultaneously be inverted in posture so that their inner panel surfaces face outwardly with respect to the feed jig 4x as shown in FIG. 19.

In the feed jig 4x, the first and second shafts 79L, 80 are operatively connected such that they can be simultaneously rotated, and the first and third shafts 79R, 81 are also operatively connected such that they can be simultaneously be rotated. However, the shafts 79L, 79R, 80, 81 may be operatively coupled to each other by the power transmitting mechanism 88L or the like for simultaneous rotation. With such an arrangement, it is possible to rotate the shafts 79L, 79R, 80, 81 simultaneously when a rotative drive force is applied to one of these shafts, but the applied rotative drive force is required to be larger when the body panels 2 are already installed on the mounting means 83, 84, 82L, 82R. According to the illustrated embodiment, inasmuch as the first and second shafts 79L, 80 and the first and third shafts 79R, 81 are separately rotated, they can be rotated with a relatively small rotative drive force even when the body panels 2 are installed on the mounting means 83, 84, 82L, 82R.

The body panel removing and installing apparatus 3x in the removal zone B will hereinafter be described with reference to FIGS. 20 through 22.

Figure 20:
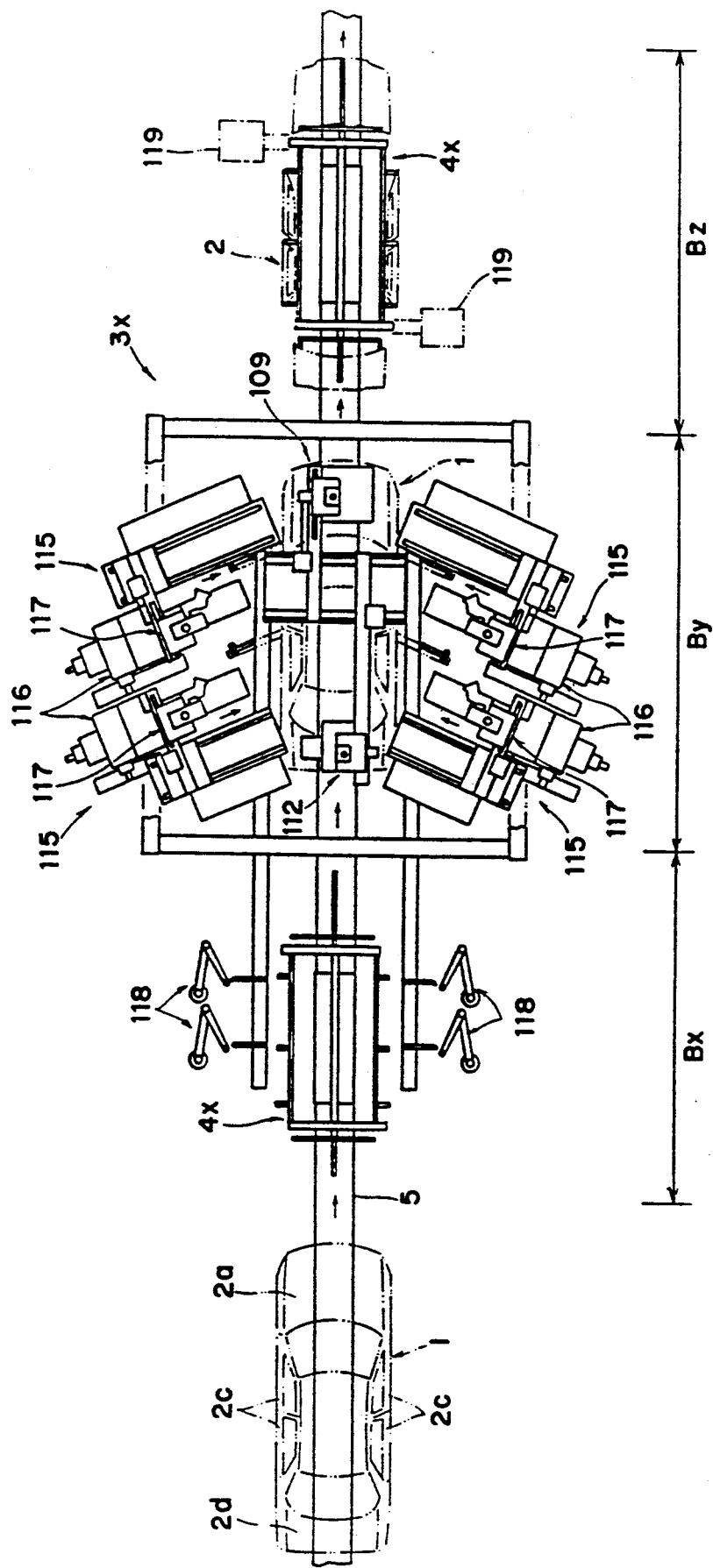
FIGS. 20 and 21 are plan and side elevational views, respectively, of the body panel removing and installing apparatus.
Figure 21:
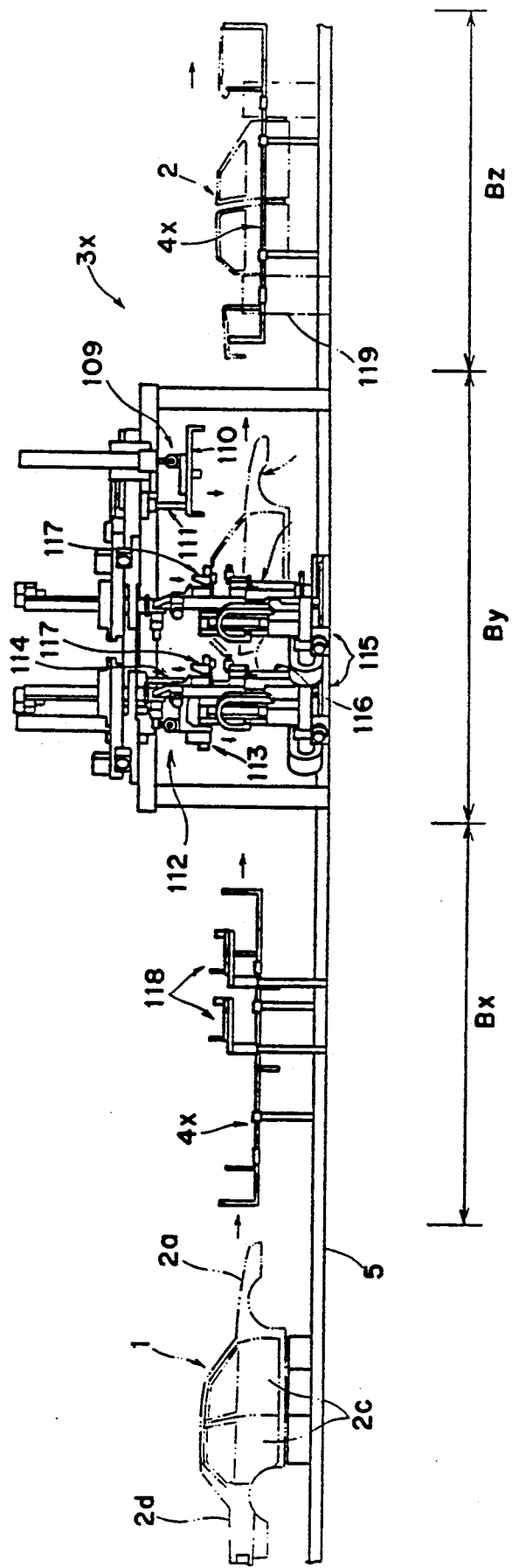
Figure 22:
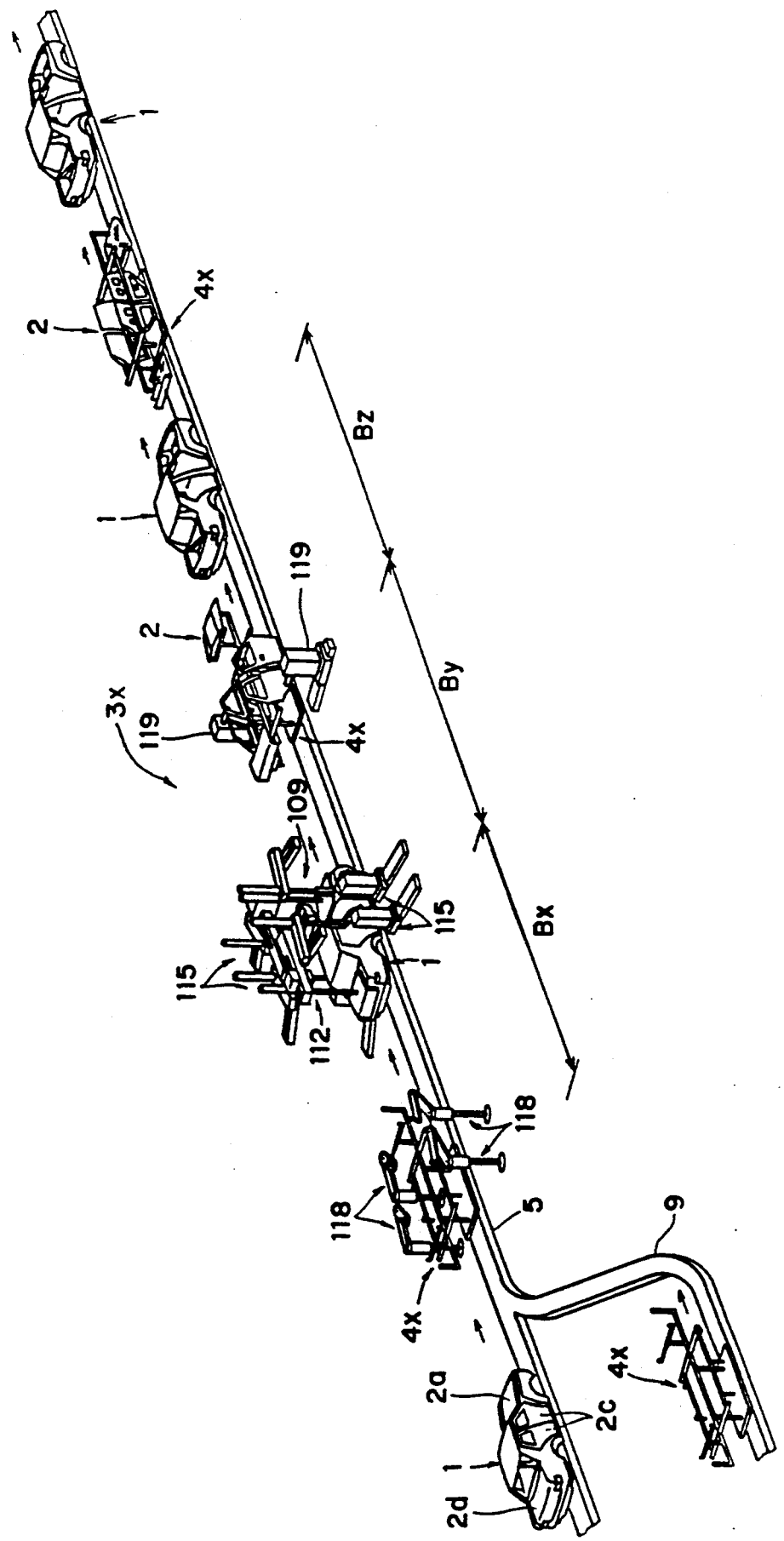
FIGS. 22 through 24 are perspective views showing respective sections of the automobile coating line and illustrative of operation of these sections.

As shown in FIGS. 20 through 22, the removal zone B includes first through third working stations Bx, By, Bz successively arranged downstream along the feed path 5 at equally spaced intervals. The second working station By has an engine hood removing and installing device 109, which is essentially identical in structure to the engine hood removing and installing device 34 of the first embodiment, the engine hood removing and installing device 109 having a vertically movable gripper means 110 and a bolt removing and installing means 111. The second working station By also has a trunk lid removing and installing device 112, which is essentially identical in structure to the trunk lid removing and installing device 35 of the first embodiment, the trunk lid removing and installing device 112 having a vertically movable gripper means 113 and a bolt removing and installing means 114. The second working station By further includes four door removing and installing devices 115, which are essentially identical in structure to the door removing and installing devices 37 of the first embodiment, the door removing and installing device 115 each having a vertically movable gripper means 116 and a hinge pin removing and installing means 117. The first working station Bx has four door openers 118 which are identical to the door openers 36 of the first embodiment. The third working station Bz has two robots 119 for applying rotative drive forces to the motion imparting members 94L, 94R in order to rotate the shafts 79L, 79R, 80, 81 of the feed jig 4x about their own axes. The robots 119 are disposed one on each side of the feed path 5.

As shown in FIG. 22, the feed jig 4x is introduced from the jig feed path 9 into the feed path 5. Automotive bodies 1 and feed jigs 4x are alternately fed along the feed path 5, and positioned successively in the working stations Bx, By, Bz.

As shown in FIGS. 20 and 21 the door openers 118 are positioned one pair on each side of the feed path 5 in the first working station Bx, and serve to open the closed doors 2c of the automotive body 1.

The engine hood removing and installing device 109 and the trunk lid removing and installing device 112 are disposed above the feed path 5 in the second working station By. When the automotive body 1 with the body panels 2 installed thereon is positioned in the second working station By, the engine hood removing and installing device 109 and the trunk lid removing and installing device 112 are brought into respective positions above the engine hood 2a and the trunk lid 2d. When the feed jig 4x is positioned in the second working station By, the engine hood removing and installing device 109 and the trunk lid removing and installing device 112 are positioned upwardly of the engine hood mounting means 83 and the trunk lid mounting means 84, respectively, of the feed jig 4x.

When the automotive body 1 is positioned in the second working station By, the engine hood 2a and the trunk lid 2d are detached, together with the bolts g, d, from the automotive body 1 by the gripper means 110, 113 and the bolt removing and installing means 111, 114, and held in their horizontal posture by these means 110 113 111 114. When the feed jig 4s is thereafter positioned in the second working station By, the engine hood 2a and the trunk lid 2d which have been held by the means 110, 113 are installed in their horizontal posture on the engine mounting means 83 and the trunk lid mounting means 84 of the feed jig 4x with the bolts a, d.

The door removing and installing devices 115 are disposed one pair on each side of the feed path 5 in the second working station By. When the automotive body 1 with the open doors 2c installed thereon is positioned in the second working station By, the door removing and installing devices 115 are positioned laterally of the respective doors 2c. When the feed jig 4x is positioned in the second working station By, the door removing and installing devices 115 are positioned laterally of the respective door mounting means 82L, 82R.

When the automotive body 1 with the doors 2c being open is positioned in the second working station By, the doors 2c and the hinge pins e are removed from the automotive body 1 and held by the gripper means 116 and the hinge pin removing and installing means 117, respectively, while the doors 2c are held vertically. When the feed jig 4x is subsequently positioned in the second working station By, the doors 2c are installed, while being kept in their vertical posture, on the door mounting means 82L, 82R of the feed jig 4x with the hinge pins e.

Operation of the overall body panel removing and installing apparatus 3x will be described below with reference to FIG. 22.

The automotive body 1 which will be positioned successively in the working stations Bx, By, Bz in the removal zone B is first operated on in the first working station Bx. More specifically, the closed doors 2c on the automotive body 1 are opened by the respective door openers 118 in the first working station Bx. Then, the body panels 2 are simultaneously removed from the automotive body 1 and held by the removing and installing devices 109, 112, 115 while the door panels 2 are being maintained in their vertical condition. Thereafter, the automotive body 1 passes through the third working station By, and is fed down the feed path 5 toward the coating zone C.

The feed jig 4x which follows the automotive body 1 first passes through the first working station Bx. Then, in the second working station By, the body panels 2 which are held by the removing and installing devices 109, 112, 115 are simultaneously installed on the mounting means 83, 84, 82L, 82R while their posture and relative positional relationship are being maintained. Then, in the third working station Bz, rotative drive forces are applied to the motion imparting members 94L, 94R by the robots 119 to turn the shafts 79L, 79R, 80, 81 by 180° about their own axes. The body panels 2 on the feed jig 4x are turned upside down until the inner panel surfaces facing outwardly. The feed jig 4x is then fed down the feed path 5, following the automotive body 1, toward the coating zone C.

In the removal zone B, therefore, the processes of removing the body panels 2 from the automotive body 1 and installing them on the feed jig 4x and the processes of feeding the automotive body 1 and the feed jig 4x are successively and efficiently carried out. Since the body panels 2 are simultaneously removed from the automotive body 1 and installed on the feed jig 4x while keeping their posture, these processes can quickly be performed in a small coating line arrangement. The body panel removing and installing apparatus 3x is also small in size and simple in construction.

A process of coating the automotive body 1 and the body panels 2 in the coating zone C will be described in detail with reference to FIG. 23.

Figure 23:
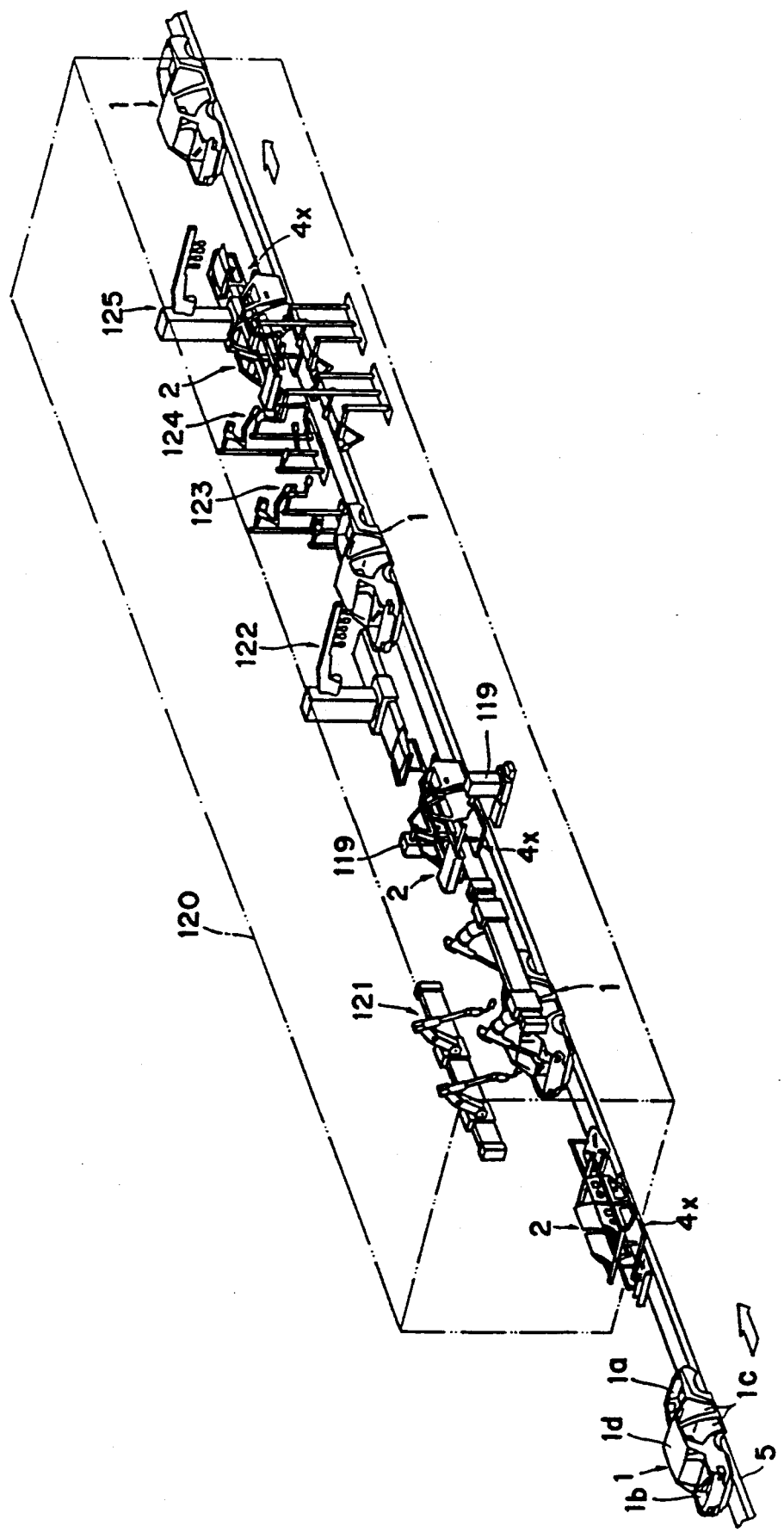

As shown in FIG. 23, the coating zone C includes a base coating booth 120 and a clear coating booth (not shown) which are disposed downstream of the base coating booth 120 on the feed path 5. The base coating booth 120 accommodates therein a coating robot 121, robots 119 for turning the shafts 79L, 79R, 80, 81 of the feed jig 4x, a reciprocator 122, a coating robot 123, and reciprocator 125, which are successively arranged downstream along the feed path 5. Each of the coating robots 121, 123, 124 is capable of coating the automotive body 1 from which the body panels 2 have been detached, and also of coating the body panels 2 mounted on the feed jig 4x.

In the coating zone C, the automotive body 1 from which the body panels 2 have been removed and the feed jig 4x on which the body panels 2 are installed are successively fed down the feed path 5 from the removal zone B into the base coating booth 120.

The peripheral edges of an engine compartment 1a, a trunk room 1b, and door openings 1c of the automotive body 1 which have entered the base coating booth 120 are coated by the coating robot 120. Then, an upper surface of the automotive body 1, i.e., a roof 1d, is coated by the reciprocator 122 above the automotive body 1, after which side surfaces of the automotive body 1 are coated by the coating robot 123. Thereafter, the upper and side surfaces of the automotive body 1 are successively coated again by the coating robot 124 and the reciprocator 125. As a result, the automotive body 1 is coated with double base coating layers.

The feed jig 4x which follows the automotive body 1 is fed on the feed path 5. The body panels 2 supported on the feed jig 4x have their inner panel surfaces facing outwardly. First, these outwardly facing inner panel surfaces are coated by the coating robot 121. Then, the body panels 2 are turned 180° by the shafts 79L, 79R, 80, 81 which are turned by the robot 119, so that the outer panel surfaces of the body panels 2 are directed outwardly. The outer panel surfaces of the engine hood 2a and the trunk lid 2d are coated by the reciprocator 122 positioned thereabove. Then, the outer panel surfaces of the doors 2c are coated laterally by the coating robot 123. Thereafter, the outer panel surfaces of the doors 2c and the outer panel surfaces of the engine hood 2a and the trunk lid 2d are coated again by the coating robot 124 and the reciprocator 125, respectively. As a consequently, double base coating layers are applied to these body panels 2.

The automotive body 1 and the body panels 2 with the base coating applied thereto are then fed down the feed path 5 into the clear coating booth, in which the automotive body 1 and the body panels 2 are coated with double clear coating layers in the same manner as the coating process in the base coating booth 120. After the clear coating layers have been applied to the automotive body 1 and the body panels 2, they are fed down the feed path 5 into a drying furnace (not shown) in which the coating layers are baked and dried. Then, the automotive body 1 and the body panels 2 are fed respectively down the automotive body feed path 7 and the body panel feed path 8. The automotive body 1 and the body panels 2 are trimmed or furnished with fittings in the trimming zone D.

Since the body panels 2 are installed on the feed jig 4x in the coating zone C while maintaining the same posture and relative positional relationship as they are installed on the automotive body 1, it is possible to feed the automotive body 1 and the feed jig 4x on the same feed path 5 and coat them with the same coating apparatus. The coating line arrangement in the coating zone C is small in size because the automotive body 1 and the feed jig 4x are fed on the same feed path 5 and coated by the same coating apparatus.

The coating robots 121, 123, 124 are required to effect different operations when coating the automotive body 1 and the body panels 2. However, since the posture of the body panels 2 mounted on the feed jig 4x and the relative positional relationship of the body panels 2 are the same as those when the body panels 2 are installed on the automotive body 1, the operations of the coating robots 121, 123, 124 with respect to the automotive body 1 and the body panels 2 are not significantly different from each other. Consequently, the construction and operation of the coating robots 121, 123, 124 are relatively simple. Inasmuch as the engine hood 2a and the trunk lid 2d, among other body panels 2, are held horizontally on the feed jig 4x, the outer panel surfaces thereof and the upper surface of the automotive body 1 can be coated by the same reciprocators 122, 125. The coating apparatus is therefore relatively simple in arrangement.

In the coating zone C, the body panels 2 mounted on the feed jig 4x can simultaneously be turned about and with the shafts 79L, 79R, 80, 81 to direct the inner and outer panel surfaces successively outwardly for coating purpose. The inner and outer panel surfaces of the body panels 2 can thus successively and efficiently be coated in the same manner as the automotive body 1 is coated.

In the base coating booth 120, because the roof 1f of the automotive body 1 and the upper ends of the doors 2c are in relatively high positions, paint mists will float around the roof 1d and the doors 2c for a while after the roof 1d is coated by the reciprocators 122, 125 and the doors 2c are coated by the coating robots 123, 124. As the engine hood 2a and the trunk lid 2d which are horizontally mounted on the feed jig 4x are positioned at substantially the same height as the upper ends of the doors 2c, the floating paint mists are not applied to the outer pane surfaces of the engine hood 2a and the trunk lid 2d. Thus, the coated surfaces of the engine hood 2a and the trunk lid 2d remain even and smooth.

Figure 24:
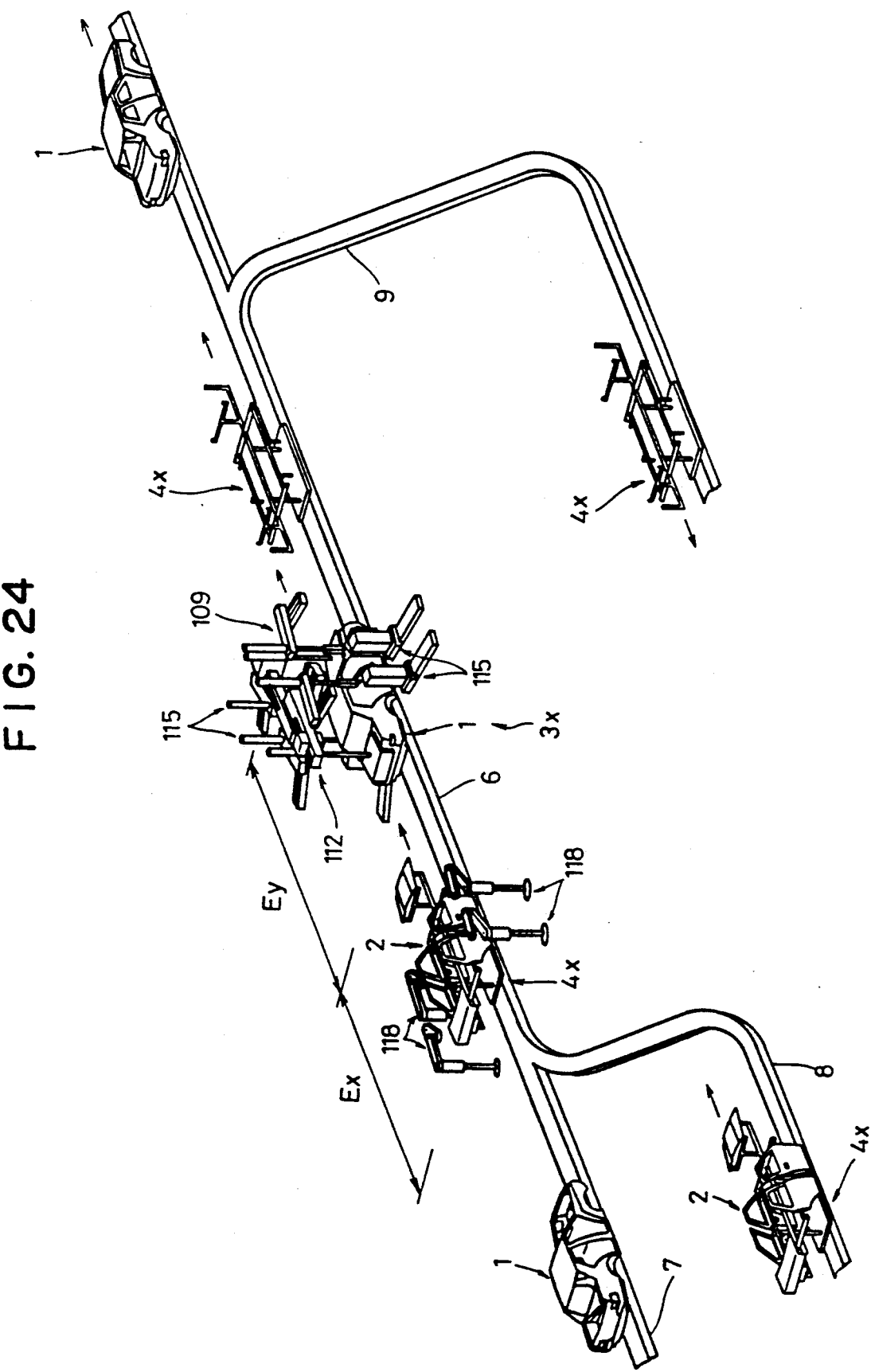

The structure and operation of the body panel removing and installing apparatus 3x in the installation zone E will be described with reference to FIG. 24.

The body panel removing and installing apparatus 3x in the installation zone E is identical in structure to the body panel removing and installing apparatus 3x in the removal zone B, except for the robots 119. The body panel removing and installing apparatus 3x in the installation zone E has first and second working stations Ex, Ey which are successively arranged downstream along the feed path 6. The door openers 118 are disposed in the first working station Ex, and the removing and installing devices 109, 112, 125 are disposed in the second working station Ey.

In the installation zone E, the feed jig 4x with the body panels 2 installed thereon and the automotive body 1 are successively introduced from the body panel feed path 8 and the automotive body feed path 7 into the feed path 6, and alternately fed on the feed path 6. While being fed along the feed path 6, the feed jig 4x and the automotive body 1 are successively positioned in the working stations Ex, Ey. At this time, the outer panel surfaces of the body panels 2 installed on the feed jig 4x are directed outwardly.

The doors 2c which are mounted in the closed, vertical posture on the feed jig 4x are opened by the door openers 118 in the first working station Ex. Then, the engine hood 2a and the trunk lid 2d are removed, together with the bolts a, d, from the feed jig 4x and held by the engine hood removing and installing device 109 and the trunk lid removing and installing device 112 in the second working station Ey. Concurrent with this, the doors 2c are removed, together with the hinge pins e, from the feed jig 4x and held by the door removing and installing devices 115. Thereafter, the feed jig 4x is transferred from the feed path 6 to the jig feed path 9 for return to the feed path 5.

The automotive body 1, positioned upstream of the feed jig 4x, passes through the first working station Ex and is then positioned in the second working station Ey. In the second working station Ey, the engine hood 2a and the trunk lid 2d which are held by the engine hood removing and installing device 109 and the trunk lid removing and installing device 112, respectively, are installed on the automotive body 1 with the bolts a, d while maintaining their horizontal posture. At the same time, the doors 2c which are held by door removing and installing device 115 are installed on the automotive body 1 with the hinge pins e while maintaining their vertical posture. Then, the automotive body 1 is continuously fed down the feed path 6 toward a subsequent processing zone.

In the installation zone E as described above the body panels 2 are removed from the feed jig 4x and installed on the automotive body 1 according to a process which is a reversal of the process in the removal zone B. The installation process can continuously and efficiently be effected on the same feed path 6. The body panel removing and installing apparatus 3x is small in size and simple in construction, and the coating line arrangement for the installation of the body panels 2 on the automotive body 1 is also small in size.

In the above automobile coating line according to the second embodiment, the processes involved in the zones B through E are successively and efficiently carried out while the automotive body 1 and the body panels 2 are successively fed down the feed paths 5, 7, 6 and the feed paths 5, 8, 6, respectively. The fasteners such as the bolts a are efficiently transferred from the removal zone B to the installation zone E with a small-size coating line arrangement. The feed jig 4x is repeatedly efficiently utilized in the coating line from the removal zone B to the installation zone E.

The feed jig 4x requires no motors or actuators for turning the body panels 2 supported thereon, and hence is simple in structure and relatively inexpensive to manufacture. Since the feed jig 4x is simple in arrangement, it is durable in operation.

The present invention has been described as being incorporated in automobile coating lines for coating four-door automobiles in the first and second embodiments. However, the principles of the present invention are also applicable to an automobile coating line for coating two-door automobiles.

Although certain preferred embodiments have been shown and described, it should be understood that many changes and modifications may be made therein without departing from the scope of the appended claims.

What is claimed is:

1. A method of assembling an automotive body and body panels, comprising the steps of:
    (a) alternately feeding an automotive body with body panels removably installed thereon and a feed jig on which the body panels can removably be installed thereon, along a first feed path;
    (b) feeding the feed jig and removing the body panels from the automotive body while they are being fed along the first feed path and installing the body panels on the feed jig which is fed upstream of the automotive body along the first feed path;
    (c) coating the automotive body from which the body panels have been removed and the body panels which have been installed on the feed jig;
    (d) alternately feeding the automotive body which has been coated and the feed jig on which the coated body panels have been installed, along a second feed path with the automotive body being positioned upstream of the feed jig; and
    (e) feeding the automobile body and removing the body panels from the feed jig while they are being fed along the second feed path and installing the removed body panels on the automotive body which is fed upstream of the feed jig along the second feed path.

2. A method according to claim 1, wherein said feed jig is arranged to install said body panels thereon with fasteners which are used to install said body panels on said automotive body, said step (b) comprising the steps of removing the body panels together with the fasteners from the automotive body, and then installing said body panels on said feed jig with said fasteners, said step (e) comprising the steps of removing said body panels together with said fasteners from said feed jig, and installing said body panels on said automotive body with said fasteners.

3. A method according to claim 1, wherein said step (c) comprises the steps of feeding said automotive body and said feed jig respectively along an automotive body feed path each of and a body panel feed path which extends from said first feed path, coating said automotive body and said body panels while they are being fed along said automotive body feed path and said body panel feed path, respectively, and thereafter successively introducing said feed jig and said automotive body into said second feed path to which said body panel feed path and said automotive body feed path are joined.

4. A method according to claim 1, wherein said step (c) comprises the steps of coating said automotive body and said body panels while they are being fed along said first feed path, thereafter feeding said automotive body and said feed jig respectively along an automotive body feed path and a body panel feed path which extending from said first feed path, and thereafter successively introducing said feed jig and said automotive body into said second feed path to which said body panel feed path and said automotive body feed path are joined.

5. A method according to claim 1, wherein said step (a) comprises the steps of feeding said automotive body along said first feed path, introducing said feed jig into said first feed path upstream of said automotive body, and alternately feeding said automotive body and said feed jig along said first feed path, and wherein said step (e) comprises the steps of feeding said feed jig, from which the body panels have been removed in said step (e), from said second feed path into a jig feed path branched from said second feed path, and then feeding said feed jig along said jig feed path back into said first feed path to which said jig feed path is joined.

6. A method of assembling an automotive body and body panels, comprising the steps of:
    (a) removing body panels from an automotive body on which said body panels have been removably installed;
    (b) thereafter, coating said automotive body and said body panels;
    (c) installing the coated body panels again on the coated automotive body; and
    said step (a) comprising the steps of: alternately feeding the automotive body with the body panels installed thereon and a feed jig on which the body panels can removably be installed thereon, along a feed path, with the feed jig being positioned upstream of the automotive body, removing the body panels from the automotive body and holding the removed body panels in a body panel removal station on said feed path, introducing said feed jig into said body panel removal station, and installing the body panels, which have been held in said body panel removal station, on said feed jig which is introduced into said body panel removal station, following the automotive body.

7. A method according to claim 6, wherein said feed jig is arranged to install said body panels thereon with fasteners which are used to install said body panels on said automotive body, said step (a) comprising the steps of alternately feeding the automotive body on which the body panels have been installed with the fasteners and the feed jig along said feed path, with said feed jig being positioned upstream of said automotive body, then positioning the automotive body in said body panel removal station, detaching the fasteners from the automotive body which has been positioned in said body panel removal station and holding the detached fasteners in said body panel removal station, thereafter removing the said body panels from the automotive body and holding the removed body panels in said body panel removal station, thereafter feeding the automotive body from said body panel removal station and positioning the feed jig, which is then introduced into said body panel removal station following the automotive body, in said body panel removal station, positioning said body panels, which have been held in said body panel removal station, on said feed jig which has been positioned in said body panel removal station, and thereafter installing the body panels on said feed jig with said fasteners which have been held in said body panel removal station.

8. A method of assembling an automotive body and body panels, comprising the steps of:
   (a) removing body panels from an automotive body on which said body panels have been removably installed;
   (b) thereafter, treating said automotive body and said body panels;
   (c) installing said body panels removably on a feed jig;
   (d) thereafter, installing said body panels again on the treated automotive body; and
   said step (d) comprising the steps of: alternately feeding the feed jig on which the body panels have been installed and the automotive body from which the body panels have been removed, along a feed path, with the automotive body being positioned upstream of the feed jig, removing the body panels from the feed jig and holding the removed body panels in a body panel removal station on said feed path, and installing the body panels, which have been held in said body panel removal station, on said automotive body which is introduced into said body panel removal station, following the feed jig.

9. A method according to claim 8, wherein said feed jig is arranged to install said body panels thereon with fasteners which are used to install said body panels on said automotive body, further including the step of installing the body panels, which have been removed from said automotive body, on said feed jig with said fasteners, said step (d) comprising the steps of alternately feeding the feed jig on which the body panels have been installed with the fasteners and the automotive body from which the body panels have been removed along said feed path, with said automotive body being positioned upstream of said feed jig, then positioning the feed jig in said body panel removal station, detaching the fasteners from the feed jig which has been positioned in said body panel removal station and holding the detached fasteners in said body panel removal station, thereafter removing the said body panels from the feed jig and holding the removed body panels in said body panel removal station, thereafter feeding the feed fig from said body panel removal station and positioning the automotive body, which is then introduced into said body panel removal station following the feed jig, in said body panel removal station, positioning said body panels, which have been held in said body panel removal station, on said automotive body which has been positioned in said body panel removal station, and thereafter installing the body panels on said automotive body with said fasteners which have been held in said body panel removal station.

10. A method of assembling an automotive body and body panels, comprising the steps of:
   (a) removing body panels from an automotive body on which said body panels have been removably installed;
   (b) installing the removed body panels on sides of a feed jig at spaced intervals along and substantially parallel to a feeding direction in which the feed jig will be fed, said body panels being angularly movable on said feed jig about axes along said feeding direction;
   (c) thereafter, coating said automotive body and said body panels, while said body panels are being fed with said feed jig;
   (d) installing the coated body panels again on the coated automotive body; and
   said step (c) comprising the steps of: feeding the body panels installed on said feed jig on a body panel feed path along said axes, together with said feed jig along a body panel feed path, turning said body panels about said axes until the body panels are oriented substantially vertically with inner panel surfaces thereof facing outwardly with respect to said feed jig, thereafter coating said inner panel surfaces of the body panels laterally with a coating robot which is positioned alongside of said body panel feed path, thereafter turning said body panels about said axes until the body panels lie substantially horizontaly with outer panel surfaces thereof facing upwardly and thereafter coating the outer panel surfaces of the body panels, from above, with a reciprocator which is positioned above the body panel feed path.

11. A method according to claim 10, wherein said step (c) further comprises the steps of turning said body panels about said axes until the body panels lie substantially horizontally with the outer panel surfaces facing downwardly, after said outer panel surfaces have been coated, and thereafter baking and drying the coated body panels.

12. A method of assembling an automotive body and body panels, comprising the steps of:
   (a) removing body panels from an automotive body on which said body panels have been removably installed;
   (b) installing the removed body panels on sides of a feed jig at spaced intervals along and substantially parallel to a feeding direction in which the feed jig will be fed, said body panels being angularly movable on said feed jig about axes along said feeding direction;
   (c) thereafter, coating said automotive body and said body panels, while said body panels are being fed with said feed jig;
   (d) installing the coated body panels again on the coated automotive body; and
   said step (c) comprising the steps of: feeding the body panels installed on said feed jig on a body panel feed path along said axes, together with said feed jig along a body panel feed path turning said body panels about said axes until the body panels lie substantially horizontally with inner panel surfaces thereof facing upwardly, thereafter coating said inner panel surfaces of the body panels, from above, with a first reciprocator which is positioned above said body panel feed path, thereafter turning said body panels about said axes until the body panels lie substantially horizontally with outer panel surfaces thereof facing upwardly, and thereafter coating the outer panel surfaces of the body panels, from above, with a second reciprocator which is positioned above the body panel feed path.

13. A method according to claim 12, wherein said step (c) further comprises the steps of turning said body panels about said axes until the body panels lie substantially horizontally with the outer panel surfaces facing downwardly, after said outer panel surfaces have been coated, and thereafter baking and drying the coated body panels.

14. A method of assembling an automotive body and body panels including an engine hood, a trunk lid, and doors, comprising the steps of:
   (a) removing body panels from an automotive body on which said body panels have been removably installed;
   (b) installing the removed body panels on sides of a feed jig while substantially maintaining the same posture and relative positional relationship of the body panels as they are installed on the automotive body, with the engine hood and the trunk lid being positioned at substantially the same height as the uppermost ends of the doors installed on the feed jig;
   (c) thereafter, coating said automotive body and said body panels, while said body panels are being fed with said feed jig;
   (d) installing the coated body panels again on the coated automotive body; and
   said step (c) comprising the steps of: feeding the feed jig on which the body panels are installed and the automotive along a common feed path, laterally coating side surfaces of the automotive body and faces of the doors installed on the feed jig while the automotive body and the body panels are being fed along said feed path, and coating an upper surface of the automotive body and faces of the engine hood and the trunk lid installed on the feed jig, from above, while the automotive body and the body panels are being fed along said feed path.

15. An apparatus for removing and installing body panels from and on an automotive body on an assembling line for assembling the automotive body and the body panels together, the body panels including an engine hood, a trunk lid, and doors, said assembling line including a removal zone wherein the body panels are removed from the automotive body on which the body panels have been removably installed, and removably installed on a feed jig, a treating zone wherein the automotive body and the removed body panels are treated, and an installation zone wherein the treated body panels are removed from the feed jig and installed again on the automotive body, said apparatus being operable to remove the body panels from one of the automotive body and the feed jig and install the removed body panels on the other in said removal zone or said installation zone, said apparatus comprising:
   a pair of door mounting means disposed on opposite lateral sides of said feed jig, for removably mounting the doors in substantially the same posture as they are installed on the automotive body;
   engine hood mounting means and trunk lid mounting means disposed on front and rear portions of said feed jig, for removably mounting the engine hood and the trunk lid, respectively, in substantially the same posture as they are installed on the automotive body;
   a feed path for intermittently feeding the feed jig and the automotive body therealong, with one of the feed jig and the automotive body, on which the body panels are installed, being positioned downstream of the other;
   a door removing and installing station, an engine hood removing and installing station, and a trunk lid removing and installing station, which are disposed on said feed path, for positioning the feed jig and the automotive body successively therein;
   door removing and installing devices, disposed on opposite sides of said feed path in said door removing and installing station and movable toward positions where the doors will be installed in a vertical posture on the feed jig and the automotive body, for removing the doors from one of the feed jig and the automotive body which is positioned in said door removing and installing station, while maintaining the posture of the doors, and installing the removed doors on the other of the feed jig and the automotive body while maintaining the posture of the doors;
   an engine hood removing and installing device, disposed above said feed path in said engine hood removing and installing station and vertically movable toward a position where the engine hood will be installed in a horizontal posture on the feed jig and the automotive body, for removing the engine hood from one of the feed jig and the automotive body which is positioned in the engine hood removing and installing station, while maintaining the posture of the engine hood, and installing the removed engine hood on the other of the feed jig and the automotive body while maintaining the posture of the engine hood; and
   a trunk lid removing and installing device, disposed above said feed path in said trunk lid removing and installing station and vertically movable toward a position where the trunk lid will be installed in a horizontal posture on the feed jig and the automotive body, for removing the trunk lid from one of the feed jig and the automotive body which is positioned in the trunk lid removing and installing station, while maintaining the posture of the trunk lid and installing the removed trunk lid on the other of the feed jig and the automotive body while maintaining the posture of the trunk lid.

16. An apparatus according to claim 15, wherein each of said door mounting means, said engine hood mounting means, and said trunk lid mounting means on said feed jig comprises means for mounting one of the body panels in substantially the same posture as it is installed on the automotive body, and wherein said door removing and installing station, said engine hood removing and installing station, and said trunk id removing and installing station are combined into a single removing and installing station.

17. An apparatus according to claim 15, wherein said door mounting means are angularly movable about a pair of longitudinal axes on opposite sides of said feed jig, said engine hood mounting means and said trunk lid mounting means being angularly movable with said door mounting means about at least one of said axes, said door, engine hood, and trunk lid mounting means including means for mounting the respective body panels only substantially parallel to each other, further including means, disposed between said door removing and installing station and a combination of said engine hood removing and installing station and said trunk lid removing and installing station, for angularly moving said door, engine hood, and trunk lid mounting means about said axes.

18. An apparatus according to claim 15, wherein said door mounting means comprises means for opening and closing the doors which are mounted on the door mounting means, and said door removing and installing device comprises means for removing and installing the doors from and on said feed jig or said automotive body while maintaining the doors in an opened, substantially vertical posture.

19. An apparatus according to claim 18, further including door openers, disposed on opposite sides of said feed path upstream of said door removing and installing station, for opening the closed doors which are installed on said feed jig or said automotive body.

20. A feed jig for feeding body panels including at least an engine hood, a trunk lid, and doors, on an assembling line for assembling the body panels and an automotive body together, said assembling line including a removal zone wherein the body panels are removed from the automotive body on which the body panels have been removably installed, a coating zone wherein the automotive body and the removed body panels are coated, and an installation zone wherein the coated body panels are installed again on the coated automotive body, said feed jig being operable to install the body panels which have been removed from the automotive body in said removal zone, and being fed in said coating zone while installing the body panels thereon, said feed jig comprising:
   at least engine hood mounting means, trunk lid mounting means, and a pair of door mounting means, for removably mounting thereon the engine hood, the trunk lid, and the doors, respectively, at spaced intervals and substantially parallel to a feeding direction in which the feed jig is fed in said coating zone;
   a pair of shafts angularly movable about their own axes and disposed respectively on opposite lateral sides of and parallel to the feeding direction; and
   said door mounting means being disposed on the opposite lateral sides and coupled for rotation with said shafts, respectively, said engine hood mounting means being coupled for rotation with one of said shafts forwardly of the door mounting means coupled to said one shaft with respect to said feeding direction, and said trunk lid mounting means being coupled for rotation with one of said shafts rearwardly of the door mounting means coupled to said last-mentioned one shaft with respect to said feeding direction.

21. A feed jig according to claim 20, wherein said mounting means on which the body panels are mounted substantially horizontally ar swingable with said shafts into positions where the body panels mounted on said mounting means are vertically superposed but spaced from each other.

22. A feed jig according to claim 21, further including swingable shafts on which said shafts are supported by arms which are disposed in a lower portion of the feed jig and extend along said feeding direction, said shafts being angularly movable about said swingable shafts into said positions where the body panels mounted on said mounting means are vertically superposed but spaced from each other.

23. A feed jig according to claim 20, further including a pair of motion imparting members coupled respectively to said shafts, whereby said mounting means can be angularly moved when drive forces are applied from an external source to said motion imparting members to angularly move said shafts about their own axes.

24. A feed jig for feeding body panels including at least an engine hood, a trunk lid, and doors, on an assembling line for assembling the body panels and an automotive body together, said assembling line including a removal zone wherein the body panels are removed from the automotive body on which the body panels have been removably installed, a coating zone wherein the automotive body and the removed body panels are coated, and an installation zone wherein the coated body panels are installed again on the coated automotive body, said feed jig being operable to install the body panels which have been removed from the automotive body in said removal zone, and being fed in said coating zone while installing the body panels thereon, said feed jig comprising:
   at least engine hood mounting means, trunk lid mounting means, and a pair of door mounting means, for removably mounting thereon the engine hood, the trunk lid, and the doors, respectively, at spaced intervals and substantially parallel to a feeding direction in which the feed jig is fed in said coating zone; and
   said door mounting means being disposed on the opposite lateral sides and said engine hood mounting means and said trunk lid mounting means being disposed in front and rear positions, respectively, with said door mounting means interposed therebetween, said engine hood, trunk lid, and door mounting means being angularly movable about shafts extending along said feeding direction.

25. A feed jig according to claim 24, wherein said mounting means comprise means for mounting the body panels in substantially the same posture as the body panels are installed on the automotive body.

26. A feed jig according to claim 24, wherein said mounting means are operatively coupled for rotation with each other.

27. A feed jig according to claim 26, further including a motion imparting member coupled to one of said mounting means, whereby said mounting means can be angularly moved when drive forces are applied from an external source to said motion imparting member to angularly move said mounting means.

28. A feed jig according to claim 24, wherein one of said door mounting means and said engine hood mounting means are coupled for rotation with each other, and the other of said door mounting means and said trunk lid mounting means are coupled for rotation with each other.

29. A feed jig according to claim 28, further including a pair of motion imparting members, one of said motion imparting member being coupled to one of said one door mounting means and said engine hood mounting means, the other motion imparting member being coupled to on of said other door mounting means and said trunk lid mounting means, whereby said mounting means can be angularly moved when drive forces are applied from an external source to said motion imparting members to angularly move said mounting means.

* * * * *